United States Patent
Lee et al.

(10) Patent No.: US 10,679,612 B2
(45) Date of Patent: Jun. 9, 2020

(54) SPEECH RECOGNIZING METHOD AND APPARATUS

(71) Applicant: Samsung Electronics Co., Ltd., Suwon-si (KR)

(72) Inventors: Hoshik Lee, Seongnam-si (KR); Hwidong Na, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 35 days.

(21) Appl. No.: 15/808,324

(22) Filed: Nov. 9, 2017

(65) Prior Publication Data
US 2018/0190268 A1 Jul. 5, 2018

(30) Foreign Application Priority Data
Jan. 4, 2017 (KR) .................. 10-2017-0001173

(51) Int. Cl.
| | | |
|---|---|---|
| *G10L 15/16* | (2006.01) | |
| *G10L 21/038* | (2013.01) | |
| *G10L 15/22* | (2006.01) | |
| *G10L 17/00* | (2013.01) | |
| *G10L 15/02* | (2006.01) | |

(52) U.S. Cl.
CPC .............. *G10L 15/16* (2013.01); *G10L 15/02* (2013.01); *G10L 15/22* (2013.01); *G10L 17/005* (2013.01); *G10L 21/038* (2013.01)

(58) Field of Classification Search
CPC ..................................................... G10L 15/16
See application file for complete search history.

(56) References Cited

U.S. PATENT DOCUMENTS

| | | |
|---|---|---|
| 9,263,036 B1 | 2/2016 | Graves |
| 2003/0233233 A1 | 12/2003 | Hong |
| 2016/0111107 A1 | 4/2016 | Erdogan et al. |

(Continued)

FOREIGN PATENT DOCUMENTS

| | | |
|---|---|---|
| CN | 104952448 A | 9/2015 |
| JP | 2015-75706 A | 4/2015 |

(Continued)

OTHER PUBLICATIONS

D. Bahdanau, J. Chorowski, D. Serdyuk, P. Brakel and Y. Bengio, "End-to-end attention-based large vocabulary speech recognition," 2016 IEEE International Conference on Acoustics, Speech and Signal Processing (ICASSP), Shanghai, 2016, pp. 4945-4949. (Year: 2016).*

(Continued)

*Primary Examiner* — Douglas Godbold
(74) *Attorney, Agent, or Firm* — NSIP Law

(57) ABSTRACT

A speech recognizing method and apparatus is provided. A speech recognizing method, implementing a speech recognizing model neural network for recognition of a speech, includes determining an attention weight based on an output value output by at least one layer of the speech recognizing model neural network at a previous time of the recognition of the speech, applying the determined attention weight to a speech signal corresponding to a current time of the recognition of the speech, and recognizing the speech signal to which the attention weight is applied, using the speech recognizing model neural network.

41 Claims, 11 Drawing Sheets

(56) References Cited

U.S. PATENT DOCUMENTS

| | | | |
|---|---|---|---|
| 2016/0111108 | A1 | 4/2016 | Erdogan et al. |
| 2016/0372118 | A1* | 12/2016 | Senior ................... G10L 17/14 |
| 2017/0140753 | A1* | 5/2017 | Jaitly ..................... G10L 15/26 |
| 2017/0200066 | A1* | 7/2017 | Wang ................. G06K 9/00664 |
| 2017/0337924 | A1* | 11/2017 | Yu ......................... G06K 9/6246 |
| 2018/0067923 | A1* | 3/2018 | Chen .................. G06F 17/2785 |
| 2018/0157743 | A1* | 6/2018 | Hori ..................... G06N 3/0445 |
| 2018/0165934 | A1* | 6/2018 | Pan .................... G06K 9/00718 |
| 2018/0330718 | A1* | 11/2018 | Hori ........................ G10L 15/16 |
| 2018/0374486 | A1* | 12/2018 | Zhao ....................... G10L 17/18 |

FOREIGN PATENT DOCUMENTS

| | | |
|---|---|---|
| KR | 10-2016-0063965 A | 6/2016 |
| KR | 10-2016-0066441 A | 6/2016 |

OTHER PUBLICATIONS

Chung, Junyoung, et al. "Gated Feedback Recurrent Neural Networks." Proceedings of the 32$^{nd}$ International Conference on Machine Learning, col. 37, Lille, France, Jul. 2015 (11 pages in English).

Kim, Doh-Suk et al., "Auditory Processing of Speech Signals for Robust Speech Recognition in Real-World Noisy Environments.", IEEE Transactions on Speech and Audio Processing, vol. 7, Issue 1, 1999 (pp. 55-69).

Park, Ki-Young, et al., "Out-of-Vocabulary Rejection based on Selective Attention Model." *Neural Processing Letters*, vol. 12, 2000 (pp. 41-48).

Chorowski, Jan., et al. "Attention-Based Models for Speech Recognition." *Advances in neural information processing systems*, 2015 (pp. 1-19).

Irie, Kazuki, et al. LSTM, GRU, highway and a Bit of Attention: An Empirical Overview for Language Modeling in Speech Recognition, *Interspeech*, RWTH Aachen University Aachen Germany, Sep. 8-12, 2016 (pp. 3519-3523).

Chan, William et al., "Listen, Attend and Spell: A Neural Network for Large Vocabulary Conversational Speech Recognition", *2016 IEEE International Conference on Acoustics, Speech and Signal Processing (ICASSP)*, 2016 (pp. 4960-4964).

Extended European Search Report dated Jun. 6, 2018 in corresponding European Application No. 17209617.4 (8 pages in English).

* cited by examiner

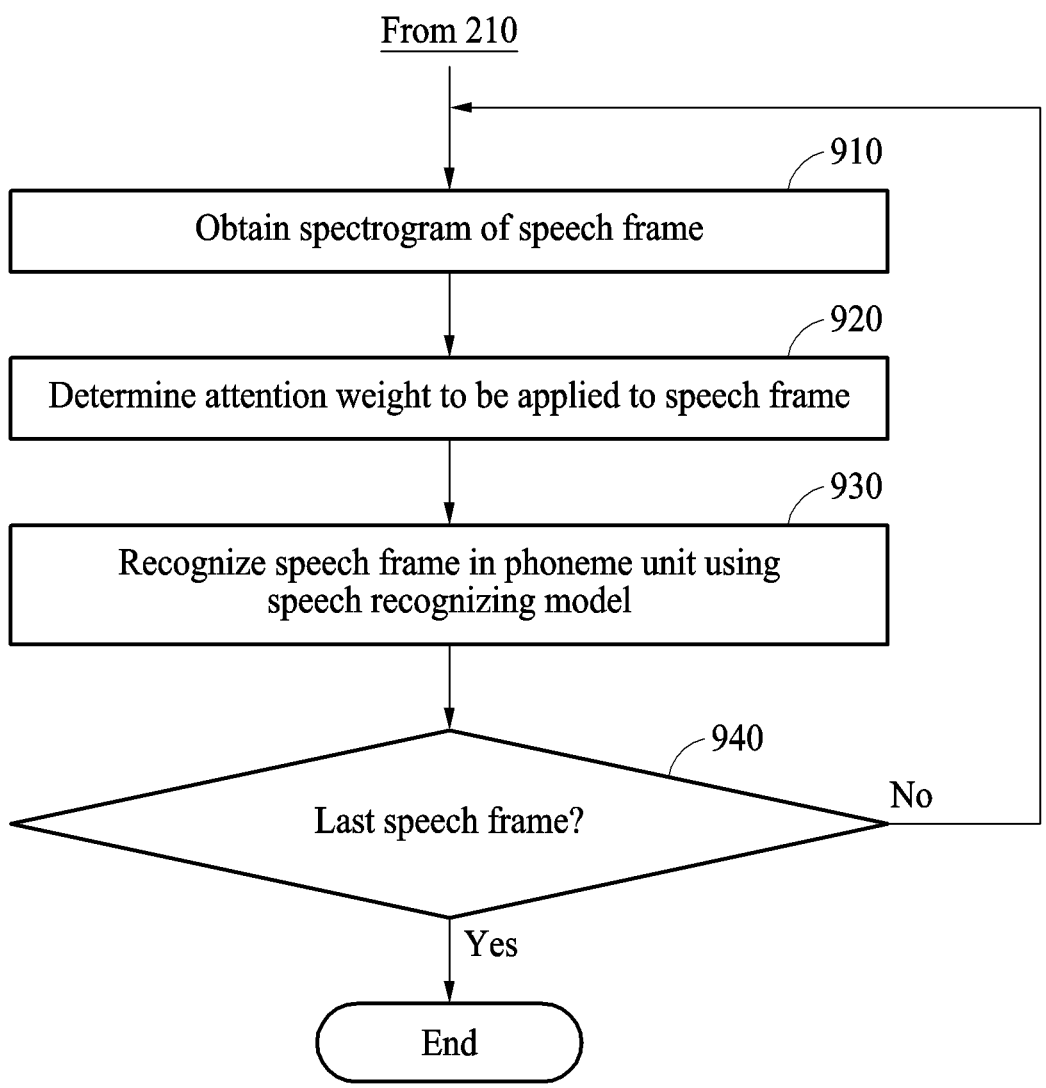

SPEECH RECOGNIZING METHOD AND APPARATUS

CROSS-REFERENCE TO RELATED APPLICATIONS

This application claims the benefit under 35 USC 119(a) of Korean Patent Application No. 10-2017-0001173 filed on Jan. 4, 2017, in the Korean Intellectual Property Office, the entire disclosure of which is incorporated herein by reference for all purposes.

BACKGROUND

1. Field

The following description relates to a speech recognition technology, including a learning and application of a speech recognizing model for speech recognition of a speech signal.

2. Description of Related Art

A speech recognizing technology analyzes a speech language of a human for communication and converts the speech language into character or text data. The speech recognizing technology is developing in response to a desire for convenience.

SUMMARY

This Summary is provided to introduce a selection of concepts in a simplified form that are further described below in the Detailed Description. This Summary is not intended to identify key features or essential features of the claimed subject matter, nor is the Summary intended to be used as an aid in determining the scope of the claimed subject matter.

In one general aspect, a processor implemented speech recognizing method, implementing a speech recognizing model neural network for recognition of a speech, includes determining an attention weight based on an output value output by at least one layer of the speech recognizing model neural network at a previous time of the recognition of the speech, applying the determined attention weight to a speech signal corresponding to a current time of the recognition of the speech, and recognizing the speech signal to which the attention weight is applied, using the speech recognizing model neural network.

The at least one layer of the speech recognizing model neural network at the previous time may be a hidden layer of the speech recognizing model neural network.

The at least one layer of the speech recognizing model neural network at the previous time may include a recurrent connection to the speech recognizing model neural network at the current time, and/or at least one of a layer, which is next provided the speech signal to which the attention weight is applied, of the speech recognizing model neural network at the current time, and a hierarchical higher layer of the speech recognizing model neural network at the current time, may include respective connections from the speech recognizing model neural network at the previous time.

The determining may include determining the attention weight based on an output value output by an output layer of the speech recognizing model neural network at the previous time.

The determining may include determining the attention weight further based on a context value determined based on information on a speaker to be recognized for emphasizing the speaker to be recognized from among other speakers.

The determining may include determining the attention weight based on a context value determined based on information on a speaker to be recognized for emphasizing the speaker to be recognized from among noise.

The determining may include determining the attention weight further based on a feature value of a speech frame input to the speech recognizing model neural network, or processed to be input to the speech recognizing model neural network, at the current time.

The method may further include dividing the speech signal into signals of different frequency components, where the applying may include respectively applying the determined attention weight to feature values of the signals of the different frequency components.

The respective applying of the determined attention weight to the feature values of the signals of the different frequency components may respectively and selectively, through and dependent on the respective application of the determined attention weight, emphasize the different frequency components upon input to the speech recognizing model neural network or before input to the speech recognizing model neural network.

The determined attention weight may be a vector having a dimension equal to a speech input vector resulting from the dividing of the speech signal and to which the determined attention weight is applied in the applying.

The feature values of the signals of the different frequency components may have amplitudes represented by sizes of respective bins for the different frequency components, and the respective applying of the determined attention weight to the feature values may include selectively adjusting the sizes of the respective bins for the different frequency components based on the applied determined attention weight.

The determining may include determining respective attention weights to be applied to each of a plurality of speech frames in response to the speech frames included in the speech signal being input to the speech recognizing model neural network or processed to be input to the speech recognizing model neural network, and the applying may include applying the determined respective attention weights to the speech frames.

The recognizing may include estimating language information indicated by the speech signal to which the attention weight is applied.

The estimating of the language information may include estimating a phoneme from the speech signal to which the attention weight is applied and the recognizing further may further include estimating a word from plural performances of the recognizing, based on respectively determined and applied attention weights, at plural times to estimate plural phonemes for the estimated word.

The speech recognizing model neural network may be configured to implement an acoustic model to perform the estimating of the phoneme and at least a language model to perform the estimating of the word.

The determining of the attention weight may be performed by a separate neural network from the speech recognizing model neural network.

The method may further include determining another attention weight based on the output value output by the at least one layer of the speech recognizing model neural network at the previous time and/or another at least one layer of the speech recognizing model neural network at the previous time, and may include applying the determined other attention weight to an output value output of a hidden layer of the speech recognizing model neural network at the current time or to a connection of the hidden layer.

The speech recognizing model neural network may be configured as being trained based on a training process that includes determining and applying training attention weights based on in-training output values output by at least one layer of an in-training speech recognizing model neural network at a previous time of a corresponding speech recognition operation of a training speech during the training of the in-training speech recognizing model.

In one general aspect, provided is a non-transitory computer-readable medium storing instructions that, when executed by a processor, cause the processor to perform one or more or all operations described herein.

In one general aspects, a processor implemented speech recognizing method, implementing a speech recognizing model neural network for a recognition of a speech, includes receiving a speech signal, and recognizing the speech signal using the speech recognizing model neural network, where the recognizing includes determining an attention weight based on an output value output by at least one layer of the speech recognizing model neural network at a previous time of the recognition of the speech, and applying the determined attention weight to a value of a layer of the speech recognizing model neural network at a current time of the recognition of the speech.

The application of the determined attention weight to the value of the layer of the speech recognizing model neural network may include applying the determined attention weight to an output value output by the layer of the speech recognizing model neural network at the current time to adjust a magnitude of the output value output by the layer of the speech recognizing model neural network at the current time, as a resultant value output to a hierarchical upper layer from the layer of the speech recognizing model neural network at the current time.

The application of the determined attention weight to the value of the layer of the speech recognizing model neural network at the current time may include adjusting, based on the determined attention weight, a trained connection weight structurally implemented within, or as a connection weighting to or from, the layer of the speech recognizing neural network at the current time.

The determining may include determining the attention weight based on an output value output by either one or both of a hidden layer and an output layer of the neural network at the previous time.

The determining may include determining the attention weight further based on a context value determined based on information on a speaker to be recognized for emphasizing the speaker to be recognized from among other speakers.

The determining may include determining the attention weight further based on a feature value of a speech frame input to the speech recognizing model at the current time.

The recognizing may further include determining another attention weight based on the output value output by the at least one layer of the speech recognizing model neural network at the previous time and/or another at least one layer of the speech recognizing model neural network at the previous time, and applying the determined other attention weight to the speech signal at the current time and performing the recognition of the speech based on the speech signal which the determined other attention weight is applied.

In one general aspect, a speech recognizing apparatus includes a processor configured to determine an attention weight based on an output value output by at least one layer of a speech recognizing model neural network at a previous time of a recognition of a speech, apply the determined attention weight to a speech signal corresponding to a current time of the recognition of the speech, and implement a recognizing, using the speech recognizing model neural network, of the speech signal to which the attention weight is applied.

The apparatus may further include a non-transitory computer readable memory configured to store instructions, which when executed by the processor cause the processor to perform the determining of the attention weight based on the output value, the applying of the determined attention weight to the speech signal, and the implementing of the recognizing of the speech signal to which the attention weight is applied.

The processor may be further configured to include the speech recognizing model neural network.

The speech recognizing model neural network may include at least one layer configured to perform the determining of the attention weight.

Any one or any combination of any two or more of a context value, a feature value of a speech frame input to, or processed for input to, the speech recognizing model neural network at the current time, and the output value output by the at least one layer of the speech recognizing model neural network at the previous time may be input to the at least one layer configured to perform the determining of the attention weight for the determining of the attention weight.

In one general aspect, a speech recognizing system includes a first processor configured to determine an attention weight based on an output value output by at least one layer of a speech recognizing model neural network at a previous time of a recognition of a speech, and a second processor configured to include the speech recognizing model neural network, and recognize a speech signal, to which the determined attention weight has been applied for a current time of the recognition of the speech, using the speech recognizing model neural network for the recognition of the speech.

The first processor may be further configured to divide the speech signal into signals of different frequency components, and the recognizing of the speech signal, to which the determined attention weight has been applied, may include recognizing the divided speech signal to which the determined attention weight has been respectively applied to feature values of the signals of the different frequency components.

The respective application of the determined attention weight to the feature values of the signals of the different frequency components may respectively and selectively, through and dependent on the respective application of the determined attention weight, emphasize the different frequency components upon input to the speech recognizing model neural network or before input to the speech recognizing model neural network.

In one general aspect, a speech recognizing apparatus includes a processor configured to determine an attention weight based on an output value output by at least one layer of a speech recognizing model neural network at a previous time of a recognition of a speech, apply the determined attention weight to an output value output by a layer of the speech recognizing model neural network at a current time of the recognition of the speech, and implement an estimating of a result of a recognizing of a speech signal at the current time using the speech recognizing model neural network implemented with the applied determined attention weight.

The apparatus may further include a non-transitory computer readable memory configured to store instructions, which when executed by the processor cause the processor to perform the determining of the attention weight, the applying of the determined attention weight, and the implementing of the estimating of the result of the recognizing of the speech signal using the speech recognizing model neural network implemented with the applied determined attention weight.

The speech recognizing model neural network may include at least one layer configured to perform the determining of the attention weight.

In one general aspect, a speech recognizing apparatus includes a processor configured to determine an attention weight based on information from a connection from a speech recognizing model neural network at a previous time of a recognition of a speech and based on a context value and/or a feature value of a speech frame input to, or processed for input to, the speech recognizing model neural network at a current time of the recognition of the speech, apply the determined attention weight to a speech signal corresponding to the current time of the recognition of the speech, and implement a recognizing, using the speech recognizing model neural network, of the speech signal to which the attention weight is applied.

The speech recognizing model neural network may include at least one layer configured to perform the determining of the attention weight based on the information from the connection from the speech recognizing model neural network at the previous time, and based on the context value and/or the feature value.

The context value may be determined based on information on a speaker to be recognized for emphasizing the speaker to be recognized from among other speakers.

Other features and aspects will be apparent from the following detailed description, the drawings, and the claims.

BRIEF DESCRIPTION OF THE DRAWINGS

FIG. 9 is a flowchart illustrating an example of a speech recognizing process.

Figure 1:
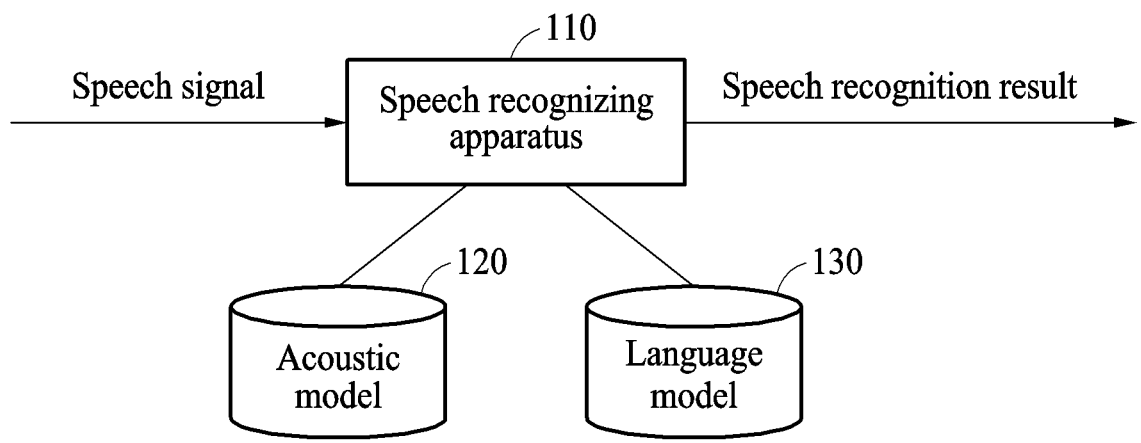
FIG. 1 illustrates an example of a speech recognizing process.

Throughout the drawings and the detailed description, unless otherwise described or provided, the same drawing reference numerals will be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of functions and constructions that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The following specific structural or functional descriptions are exemplary to merely describe the examples, and the scope of the examples is not limited to the descriptions provided in the present specification. Various changes and modifications can be made thereto by those of ordinary skill in the art.

Although terms of "first" or "second" are used to explain various components, the components are not limited to the terms. These terms should be used only to distinguish one component from another component. For example, a "first" component may be referred to as a "second" component, or similarly, and the "second" component may be referred to as the "first" component within the scope of the right according to the concept of the present disclosure.

As used herein, the singular forms are intended to include the plural forms as well, unless the context clearly indicates otherwise. It should be further understood that the terms "comprises" and/or "comprising," when used in this specification, specify the presence of stated features, integers, operations, elements, components or one or more combinations/groups thereof in one or more example embodiments s, but do not preclude the presence or addition of one or more other features, integers, operations, elements, components, and/or combinations/groups thereof in alternative embodiments, nor the lack of such stated features, integers, operations, elements, and/or components, and/or combinations/groups in further alternative embodiments unless the context and understanding of the present disclosure indicates otherwise. In addition, the use of the term 'may' herein with respect to an example or embodiment, e.g., as to what an example or embodiment may include or implement, means that at least one example or embodiment exists where such a feature is included or implemented while all examples and embodiments are not limited thereto.

Unless otherwise defined herein, all terms used herein including technical or scientific terms have the same meanings as those generally understood by one of ordinary skill in the art based on an understanding of the present disclosure. Terms defined in dictionaries generally used should be construed to have meanings matching with contextual meanings in the related art and the present disclosure and are not to be construed as an ideal or excessively formal meaning unless otherwise defined herein.

FIG. 1 illustrates an example of a speech recognizing process.

A speech recognizing apparatus 110 performs speech recognition and outputs a speech recognition result by recognizing a speech signal input to the speech recognizing apparatus 110. The speech recognition indicates a process of converting spoken language information included in the speech signal to corresponding text information, for example. The speech recognizing apparatus 110 analyzes the input speech signal and estimates text information indicated by language information included in the speech signal.

In an example, the speech recognizing apparatus 110 may be embedded in, configured to interact with, or representative of devices such as, for example, a mobile phone, a cellular phone, a smartphone, a personal computer (PC) (such as a laptop, a notebook, a netbook, or a tablet PC (tablet), a personal digital assistant (PDA), a digital camera, a game console, an MP3 player, a personal multimedia player (PMP), an e-book, a global positioning system (GPS) navigation device, a set-top box, or a home appliance, or any other mobile or stationary device capable of wireless or network communication. The speech recognizing apparatus 110 may also be embedded in, configured to interact with, or representative of devices such as, for example, a smart appliance, an intelligent vehicle, an autonomous vehicle, a smart building system, a smart home system, a smart office system, or a smart electronic security system. Also, the speech recognizing apparatus 110 may be included in, configured to interact with, or representative of a wearable device worn on a body of a user, such as a ring, a watch, a pair of glasses, a bracelet, an ankle bracelet, a belt, a necklace, an earring, a helmet, or a device embedded in clothing. The speech recognizing apparatus 110 may be included with, or configured to interact with, one or more microphones to capture the speech signal. In addition, the speech recognizing apparatus may be further included with, or configured to interact with, an analog to digital converter (ADC) and parser that may parse the captured speech signal into digital audio frames, for example.

The speech recognizing apparatus 110 extracts a feature from a speech signal and estimates a speech recognition result based on the extracted feature. In an example, the speech recognizing apparatus 110 obtains or generates a spectrogram from/of the speech signal and extracts a frequency feature of the speech signal from the spectrogram. The speech recognizing apparatus 110 may obtain or generate the spectrogram by representing a result of analyzing a spectrum of the speech signal in a time-frequency domain using a Fourier transform, for example. As only an example, the speech recognizing apparatus 110 may represent a value of a fundamental frequency on an x-axis and an amplitude value on a y-axis by calculating the fundamental frequency of the speech signal and calculating the amplitude value of a frequency corresponding to n times, for example, one time, two times, or three times, of the fundamental frequency using the example Fourier transformation. Here, n is a natural number. The spectrogram may consecutively represent a size of the amplitude value with respect to each frequency position by increasing a size of a bin as the amplitude value increases and decreasing the size of the bin as the amplitude value decreases in the generated spectrum. The speech recognizing apparatus 110 may extract frequency feature information represented in the spectrogram as feature(s) of the speech signal.

A method of extracting such feature(s) from the speech signal is not limited thereto and various methods may be used to extract such feature(s) from the speech signal. For example, the speech recognizing apparatus 110 may use a feature value of a Mel-frequency cepstrum coefficient (MFCC) based on a nonlinear frequency feature of a human ear for speech recognition, as an example extracted feature. The feature value of the MFCC may be obtained by the speech recognizing apparatus 110, for example, (1) dividing a speech signal in a speech frame unit based on a time window, (2) converting a speech frame to a frequency area using a fast Fourier transform (FFT), (3) dividing the speech frame into signals of frequency bands using a filterbank, (4) calculating an energy of each of the signals of frequency bands, and (5) applying a discrete Cosine transform (DCT) to the calculated energy, for example.

The speech recognizing apparatus 110 may implement one or more speech recognizing models including an acoustic model 120 and a language model 130, for example, to estimate the speech recognition result. The acoustic model 120 may be used to recognize the speech signal in a phoneme unit, for example, based on the feature extracted from the speech signal. The speech recognizing apparatus 110 may estimate words indicated by the speech signal based on the speech recognition result in the phoneme unit obtained by the acoustic model 120. The language model 130 may be used to obtain probability information based on a connection relationship between words. For example, the language model 130 may provide the probability information related to a subsequent word to be linked after a word input to the language model 130. For example, in response to a word "this" being input to the language model 130, the language model 130 provides the probability information related to a case in which "is" or "was" is linked after "this". In an example, the speech recognizing apparatus 110 selects the connection relationship between words of which a probability is greatest based on the probability information by the language model 130 and outputs a result of the selecting as the speech recognition result.

The acoustic model 120 and/or the language model 130 may be implemented through one or more processors configured as one or more models or neural networks or such one or more processors configurable as the one or more models or neural networks, e.g., based on trained neural network parameters stored in a memory of the speech recognizing apparatus 110. The neural network(s) may be recognition model(s) implemented solely through hardware or a combination of one or more computing hardware and instructions, i.e., stored in one or more non-transitory computer readable media, which when executed by the one or more computing hardware cause the one or more computing hardware to configure as and implement such neural network(s). The neural network may be trained during a learning or training process using training data, such as described further below with respect to FIG. 11, for example. In an example, the speech recognizing apparatus 110 may also perform the training or obtain corresponding trained parameters from an external processing device and/or server or from the memory of the speech recognizing apparatus 110. In an example, a recurrent neural network (RNN), where an output value of a hidden layer corresponding to a previous time may be re-input to the same hidden layer corresponding to a current time, for example, may be configured to implement the acoustic model 120 and the language model 130, e.g., together or collectively, by the speech recognizing apparatus 110 for the speech recognizing discussed herein.

In an example, the speech recognizing model implemented by the speech recognizing apparatus 110 configured as the neural network may dynamically implement spectral masking by receiving a feedback on a result calculated by the neural network at the previous time. When the spectral masking is performed, feature values for each frequency band may selectively not be used in full as originally determined/captured, but rather, a result of a respective adjusting of the magnitudes of all or select feature values for all or select frequency bands, e.g., according to the dynamically implemented spectral masking, may be used for or within speech recognition. Also, for example, such a spectral masking scheme may be dynamically implemented to intensively recognize a speech of a person other than noise from a captured speech signal and/or to intensively recognize a speech of a particular or select speaker to be recognized when plural speeches of a plurality of speakers are present in the captured speech signal.

A person has an ability of concentrating on a signal of a particular spectrum area based on a speech to be input and adaptively removing a noise included in the speech signal. For example, a descending path from an auditory area of a brain to a peripheral nerve exists in a human auditory system, with the descending path being able to affect a selective focusing and ability of recognizing a speech in a noisy environment. In previous technology speech recognizing approaches, such focusing may not be available or may be difficult to implement, and thus this is an example technological failing in this aspect in processor implemented speech recognition techniques. Rather, in an example, a speech recognizing model according to one or more embodiments may well recognize speech in a noisy environment more accurately and/or recognize different speech by modeling such a descending path and provide a selective attention ability for improved speech recognition. For this, an example neural network that forms or is configured to implement the speech recognizing model may adjust the speech signal before the speech signal is input to the neural network, or upon input to the neural network, based on a determined attention weighting. For example, an extracted feature of a captured speech frame to which the attention weight has been applied may be input to the neural network, such that a degree of importance of feature values of one or more frequency areas among feature values for frequency areas of the speech frame may be controlled and thus differently emphasized and/or considered based on the attention weight. For example, attention weightings for one or more feature values of each of plural frequency areas may be respectively implemented through the applied attention weight(s) in response to the respective feature values for each set frequency area of the speech frame being input.

In an example, the speech recognizing apparatus 110 may determine the attention weight to be applied to the speech signal based on an output value output by at least one layer of the neural layer at a previous time. For example, the at least one layer may be a hidden layer of the neural network and the output of the example hidden layer may be a single value, multiple output node values, a resulting feature vector, or feature map, etc., as only examples. In another example, e.g., in addition to such considerations of previous time layer outputs, the neural network may determine the attention weight by considering a context value. For example, the speech recognizing apparatus may be configured to determine the context value and then rely on that determined context value when determining the attention weight. In still another example, the feature value of the speech signal to be input at a current time, e.g., before application of the determined attention weight, may additionally be used to determine the attention weight that is then available to be applied to the example input, example connection relationships corresponding to an input layer, example connection relationships corresponding to the same or other layers in the current and/or subsequent times, and/or outputs of the example input layer or other layers in the current or subsequent times, as only examples.

For example, the speech recognizing apparatus 110 may determine the attention weight based on information associated with a previous time and adaptively adjust the emphasis given to each frequency area of the speech signal to be recognized at the current time based on the applied attention weight. Thus, a recognition performance may be enhanced by reducing an influence of a noise component on a result of recognizing the speech signal and/or concentrating on a speech signal of a particular speaker.

Example operations by which a speech recognizing apparatus recognizes a speech signal using a speech recognizing model, e.g., through a configured neural network, will be discussed in greater detail below. Here, any or all such operations may be implemented by the speech recognizing apparatus 110 of FIG. 1, the speech recognizing apparatuses discussed respect to FIGS. 2-9, the speech recognizing apparatuses 1000 of FIGS. 10A and 10B, the training apparatus discussed with respect to FIG. 11, or another speech recognizing apparatus as embodiments are not limited to the particular speech recognizing apparatuses described herein.

Figure 2:
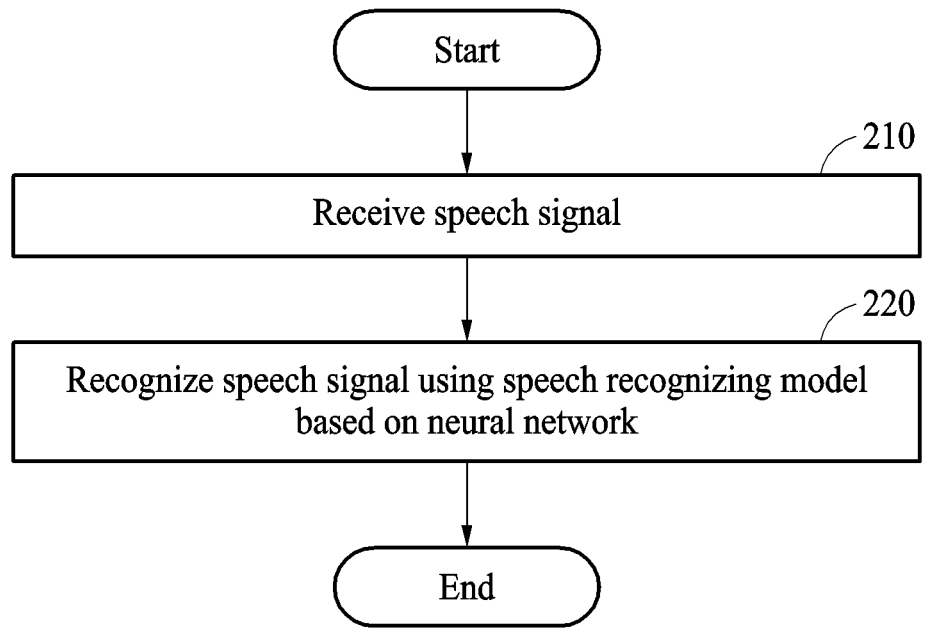
FIG. 2 is a flowchart illustrating an example of a speech recognizing method.

FIG. 2 is a flowchart illustrating an example of a speech recognizing method.

Figure 10A:
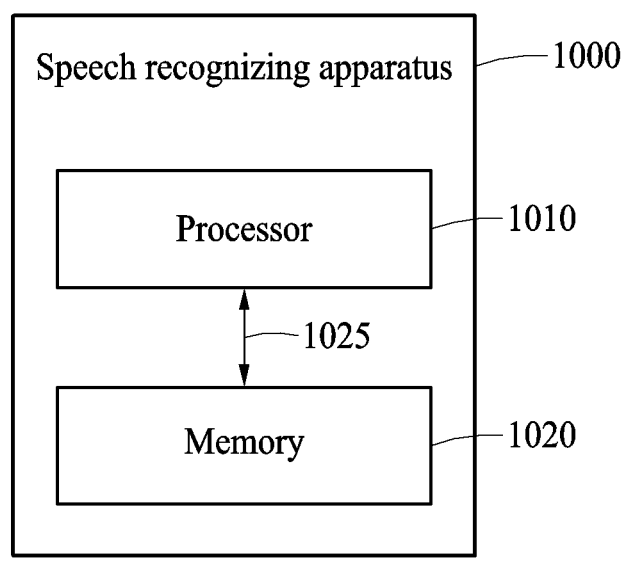
FIGS. 10A-10B illustrate examples of a speech recognizing apparatus.
Figure 10B:
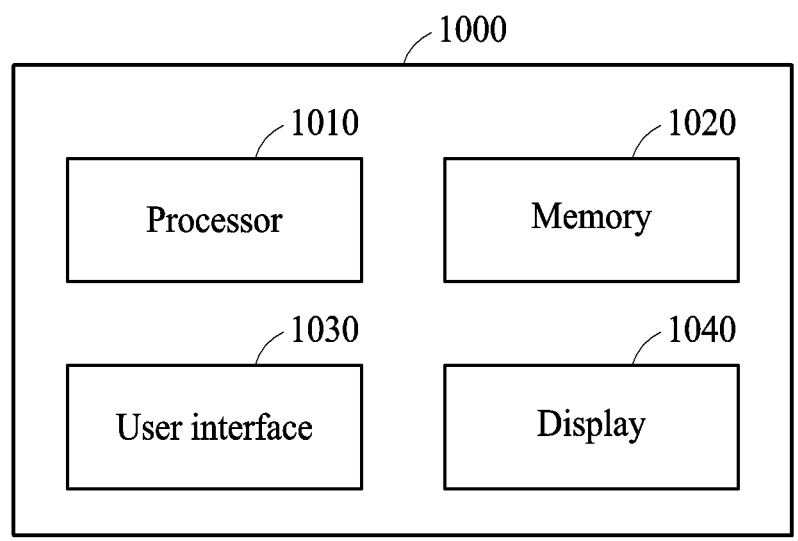

The speech recognizing method may be performed by a speech recognizing apparatus, for example, the speech recognizing apparatus 110 of FIG. 1, the speech recognizing apparatuses 1000 of FIGS. 10A and 10B, or any other speech recognizing apparatuses or training apparatuses discussed herein, noting that embodiments are not limited thereto. Referring to FIG. 2, in operation 210, the speech recognizing apparatus receives or captures a speech signal. The speech signal may include, or captured to include through further processing, a plurality of speech frames including information on a speech changing as time passes. The speech frames may include, for example, a frequency feature value of a Mel-frequency cepstrum coefficient (MFCC) or a value of a bin based on a frequency component represented in a spectrogram. The speech recognizing apparatus may divide the speech signal into signals of different frequency components and extract a corresponding frequency feature value from the divided signals. Each of the speech frames may include a plurality of channels based on the frequency components and the frequency feature value of the frequency component corresponding to each channel.

In operation 220, the speech recognizing apparatus recognizes the speech signal using a speech recognizing model implemented through one more trained neural networks. A speech frame may be input to the speech recognizing model or a plurality of speech frames may be simultaneously input to the speech recognizing model. A feature value of the signals of the different frequency components divided from the speech signal may be input to the speech recognizing model.

In an example, the speech recognizing apparatus determines attention weights based on interim or hidden layer values or states from at least one layer of the neural network configured to implement the speech recognizing model at a previous time of the input speech, and may further be based on at least one of context values and input speech feature values to the speech recognizing model corresponding to a current time of the input speech, and applies the determined attention weights to the speech signal prior to or after input to the speech recognizing model and/or applies determined attention weights to interim or hidden layer values or connections at the current time of the input speech. For example, the speech recognizing apparatus may apply respective attention weights for each frequency component in the speech frame input to the speech recognizing model for the input speech. As noted, the attention weight may also, or alternatively, be determined by at least one layer included in the neural network of the speech recognizing model or another neural network trained to determine the attention weight based on input information, such as based on input context information, information from or about one or more layers, or their outputs or states, of the neural network implementing the speech recognizing model, the input speech, and/or other information for use by the speech recognizing model for speech recognition of the input speech.

A weight on a signal of a predetermined frequency component may be increased, decreased, or maintained the same in the speech frame input to the speech recognizing model based on the attention weight. For example, in the neural network example, speech frame input may be provided to an input layer of the neural network after which respectively trained weights are applied to the speech frame input before or upon consideration by a next hierarchical layer of the neural network. This trained weight may thus be adjusted by the determined attention weight. An increasing of the weight by the attention weight may correspond to that signal of the frequency component being emphasized or given more consideration when the speech recognizing model estimates a recognition result of the speech frame. Conversely, the decreasing of the weight by the attention weight may correspond to that signal of the frequency component being deemphasized or given less consideration when the speech recognizing model estimates the recognition result of the speech frame. The attention weight may also apply a weight adjustment that can cause a select frequency component to not be considered when the speech recognizing model estimates the recognition result of the speech frame. In a further example, feature values for the different frequency components may have amplitudes represented by sizes of respective bins for the different frequency components, and respectively determined attention weight(s) may be applied to the feature values to selectively adjust the sizes of the respective bins for the different frequency components based on the applied determined attention weight, thereby implementing such maintaining or selective emphasizing of the respective frequency components. Thus, in an example, the attention weighting may perform a role of spectral masking.

In another example, the speech recognizing apparatus may apply the attention weight to a feature or output layer values transferred between layers of the neural network or to previously trained connection weights for such layers. As only an example, an example current layer of the neural network may respectively apply trained connection weightings to each of multiple output or feature values of a hierarchical lower layer that are to be input to at least one node of the current layer (or such trained connection weightings are applied before input to the current layer), the results of those trained weightings may be summed, for example, and a result of the summing may be applied to linear or non-linear activation function to be output as a result of the at least one node of the current layer. The determined attention weight(s) may be applied to at least one of such connection relationships between the hierarchical previous/lower layer and the current layer of the neural network, such as by adjusting one or more of the respective trained weightings and/or by adjusting an output of an activation function of the hierarchical previous/lower layer or of the current layer based on the determined attention weighting. For example, in response to an attention weight being applied to an output of the hierarchical lower layer, a magnitude of the value transferred from the hierarchical previous/lower layer toward the current layer may be adjusted depending on the attention weight. As only examples, the attention weight may be determined based on respective output or interim values of one or more layers of the neural network at the previous time, as well at least one of the example context value and the speech input values to the speech recognizing model corresponding to the current time.

The speech recognizing apparatus may recognize the speech signal of a speech and to which the attention weight has been applied using the speech recognizing model and output a result of the recognizing of the speech signal and/or a recognizing of the speech based on a combination of recognitions of multiple such speech signals. In an example, the speech recognizing model may be an acoustic model that estimates language information included in the speech signal in a phoneme unit. Recognition results estimated in the phoneme units may be respectively input to another speech recognizing model corresponding to a language model, for example, and information on an entire text of the language information included in the speech signal may be estimated by the other speech recognizing model. As explained further below, the neural network that is configured to implement the speech recognizing model may be trained in advance to output the recognition result corresponding to the input information. For example, as a result of such training, structural parameters and connection weight parameters of the trained neural network may be stored, and the trained neural network reproduced, implemented, and utilized based on those stored structural parameters and connection weight parameters. Thus, the recognition result output by the speech recognizing model may be obtained based on trained structural parameters and connection weight parameters of the neural network determined in the training process. Further descriptions of processes in which the speech recognizing apparatus may recognize the speech signal using such speech recognizing models are provided in greater detail below with reference to FIGS. 3 through 9.

Figure 3:
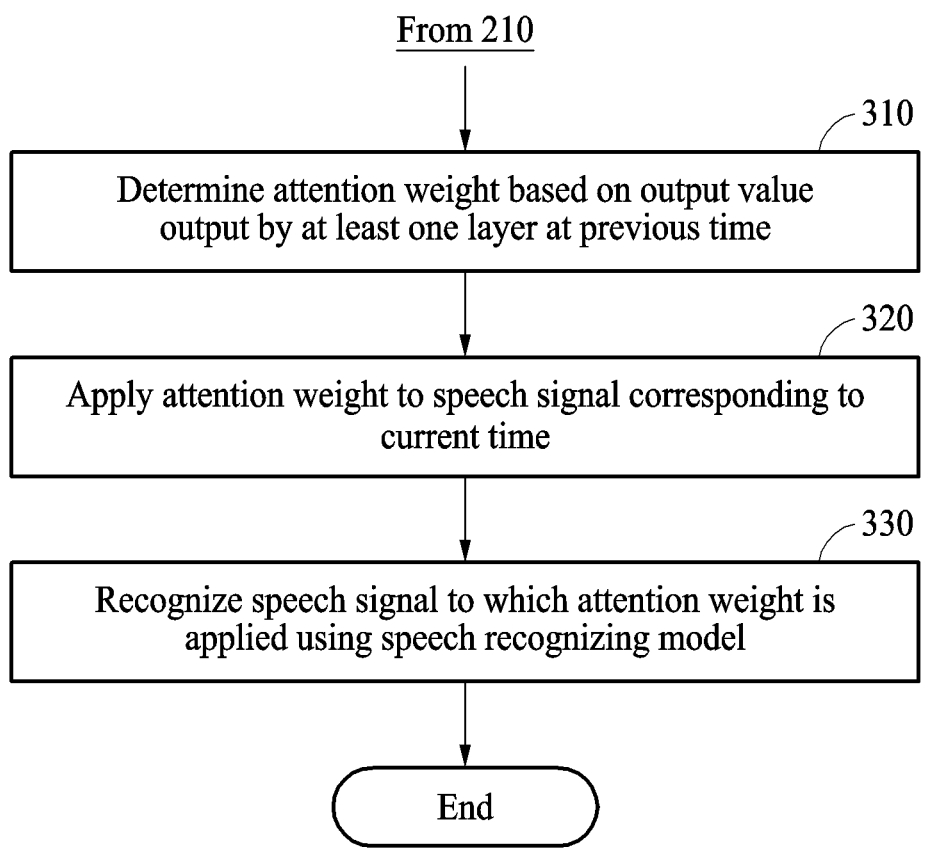
FIG. 3 is a flowchart illustrating an example of a speech recognizing process.

FIG. 3 is a flowchart illustrating an example of a speech recognizing process. Referring to FIG. 3, a speech recognizing apparatus applies an attention weight to a speech signal input to a speech recognizing model and performs speech recognition on the speech signal to which the attention weight has been applied. Here, operations of FIG. 3 will be discussed respect to the speech recognizing apparatus, which may be any of the speech recognizing apparatus 110 of FIG. 1, the speech recognizing apparatuses 1000 of FIGS. 10A and 10B, or any other speech recognizing apparatuses or training apparatuses discussed herein, as only non-limiting examples.

Referring to FIG. 3, in operation 310, the speech recognizing apparatus determines the attention weight based on an output value output by at least one layer, e.g., at least one of a hidden layer or an output layer, of a neural network that is configured to implement the speech recognizing model at a previous time in a recognizing of speech by the speech recognizing apparatus, for implementing the speech recognition model at a current time in the recognizing of the speech by the speech recognizing apparatus based on the determined attention weight. In an example, a speech frame for the current time including signals of different frequency components is input to the speech recognizing model by the speech recognizing apparatus, and the speech recognizing apparatus determines the attention weight of each of the signals of the different frequency components. Thus, due to the applied attention weight, a resulting different emphasis or focus may be implemented between the signals of the different frequency components input to the speech recognizing model compared to an original or equal emphasis or consideration across the frequency components, resulting in the different frequency components having different weighted effects on the final estimated speech of the speech frame by the speech recognizing model. In another example, the speech recognizing apparatus determines the attention weight for the current time based on a feature value of the speech frame input to the speech recognizing model at the current time.

In another example, the speech recognizing apparatus determines the attention weight based on a context value determined by the speech recognizing apparatus based on information on a speaker to be recognized in addition to the example output value output by the example at least one layer of the neural network at the previous time. For example, the context value may be used to intensively recognize a speech of the speaker to be recognized when speeches of a plurality of speakers are included in the speech signal. In an example, the context value may be determined based on determined or user set information on an age of the speaker, a gender of the speaker, a sample speech of the speaker, or a determined position of the speaker. In addition, the speech recognizing apparatus may determine the attention weight based on the feature value of the speech frame input to the speech recognizing model at the current time, e.g., in addition to the consideration of the context value to determine the attention weight.

In operation 320, the speech recognizing apparatus applies the determined attention weight to the speech signal corresponding to the current time. For example, the speech recognizing apparatus may apply the attention weight to a signal of each frequency component of the speech frame input to the speech recognizing model. As an example, an immediately previous speech frame of a captured speech may have been input to the speech recognition model at the previous time, for recognition of the previous speech frame at the previous time. With the example current time, weight on the signal input to the speech recognizing model for each frequency component may be adjusted based on the attention weight and thus, speech recognition of the captured speech may be performed by reducing an influence of a noise component and/or concentrating on a speech of a particular speaker. Here, as also demonstrated with FIGS. 4-5 and 7-8, the speech recognition performed for the previous speech frame may also have been based on a then applied attention weight determined at the previous time based on information from a further previous speech recognition operation for the captured speech.

In another example, a plurality of speech frames for the captured speech and included in the speech signal are simultaneously input to the speech recognizing model at the current time. In this example, the speech recognizing apparatus may determine an attention weight of each of the speech frames input to the speech recognizing model and apply the determined attention weights to each of the speech frames corresponding to the determined attention weights. Similar to above, the speech recognition performed at the previous time may also have been based on then similarly determined respective attention weights determined at the previous time, for then input plural speech frames for the captured speech, based on information from a further previous speech recognition operation for the captured speech.

In operation 330, the speech recognizing apparatus recognizes the speech signal to which the attention weight has been applied using the speech recognizing model. In an example, in response to the speech signal to which the attention weight has been applied being input to the speech recognizing model, the speech recognizing model estimates language information indicated by the speech signal in a phoneme unit and outputs a result of the estimating. In another example, the output is in a word format, such as where the result of estimated language information in the phoneme unit and according to the applied attention weighting is further implemented through a language model as discussed above further implemented by the speech recognizing model. In an example, the language model and the acoustic model may be implemented in a same neural network, such as with output results of the acoustic model being provided to another layer of the neural network implementing the language model.

Figure 4:
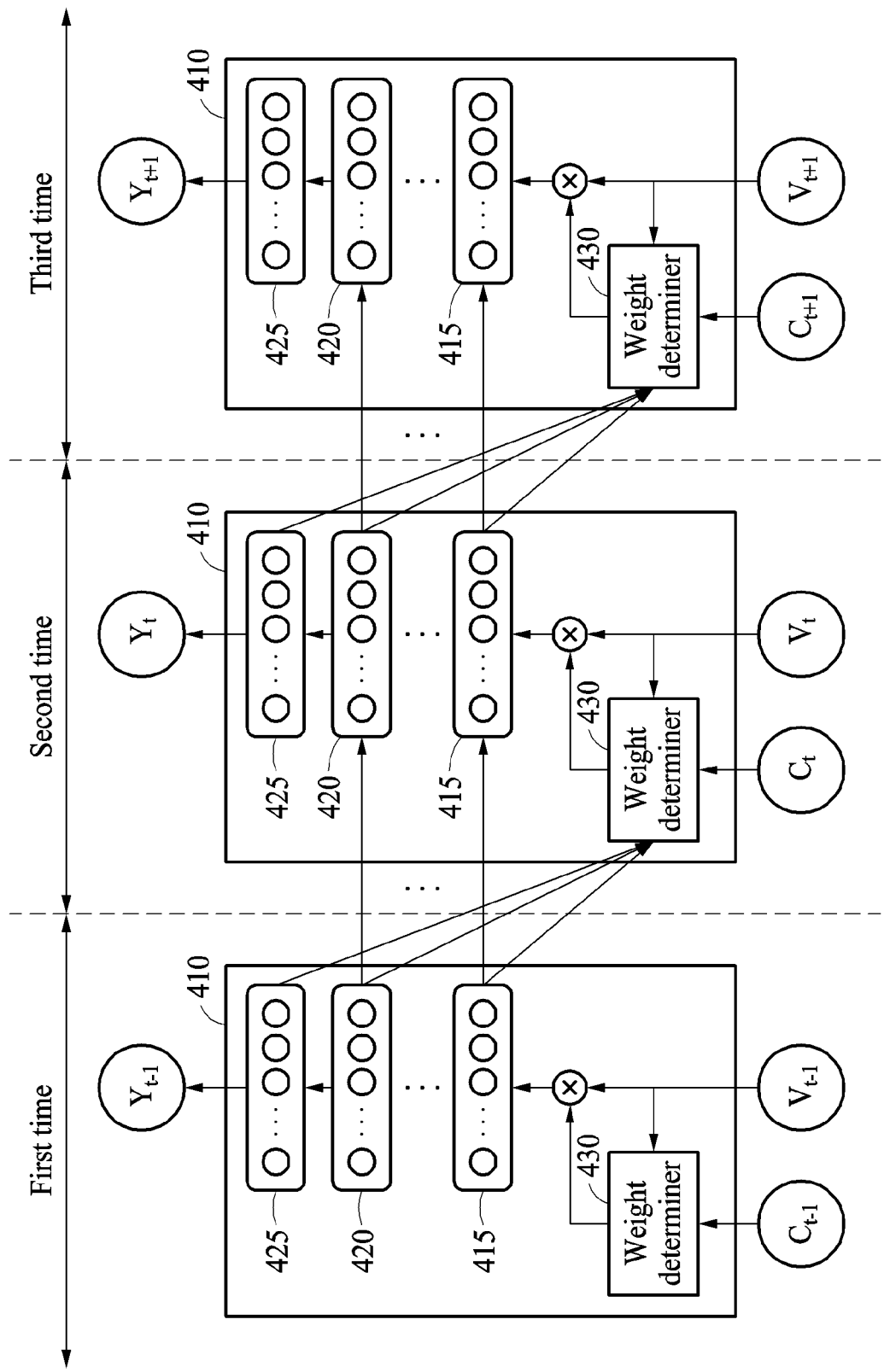
FIGS. 4 and 5 each illustrate an example in which speech recognition is performed based on a speech recognizing model.
Figure 5:
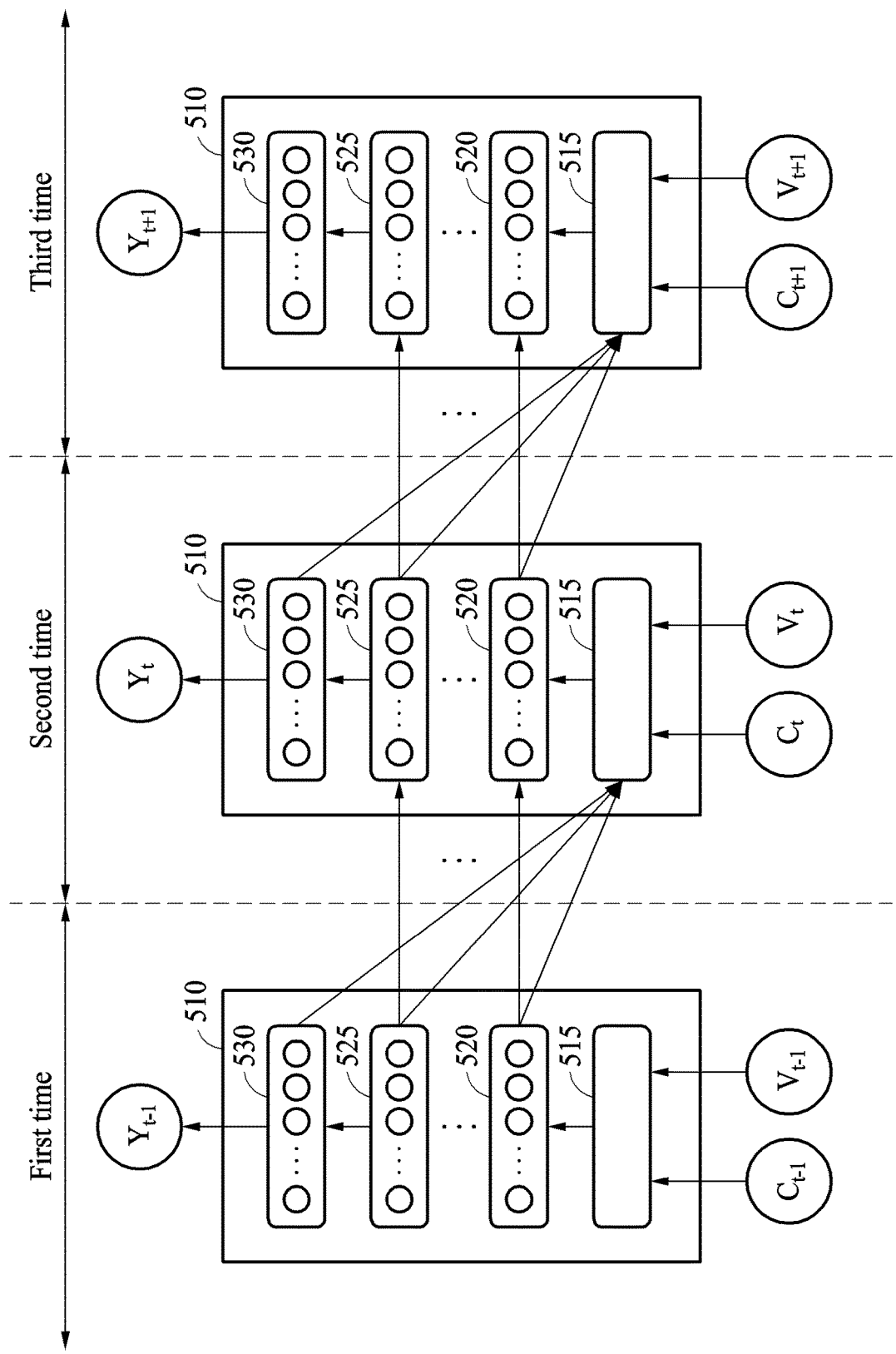

FIGS. 4 and 5 each illustrate an example in which speech recognition is performed based on a speech recognizing model. Respective operations of FIGS. 4 and 5 will be discussed respect to the speech recognizing apparatus, which may be any of the speech recognizing apparatus 110 of FIG. 1, the speech recognizing apparatuses 1000 of FIGS. 10A and 10B, or any other speech recognizing apparatuses or training apparatuses discussed herein, noting that embodiments are not limited thereto.

Referring to FIG. 4, a feature of a speech signal is input to a speech recognizing model 410 at each time period. For example, a feature of a speech signal $V_{t-1}$ is input to the speech recognizing model 410 at a first time, a feature of a speech signal $V_t$ is input to the speech recognizing model 410 at a second time, and a feature of a speech signal $V_{t+1}$ is input to the speech recognizing model 410 at a third time. The speech signal $V_{t-1}$, the speech signal $V_t$, and the speech signal $V_{t+1}$ may correspond to speech frames that are sequentially input to the speech recognizing model 410 as time passes from t−1, t, to t+1. As a non-limiting examples, a feature of a speech signal may include a feature value, for example, a frequency component value, extracted from a spectrogram, a feature value extracted using a filterbank, and a feature value of a Mel-frequency cepstrum coefficient (MFCC), e.g., as determined through signal processing of captured audio by the one or more processors of the speech recognizing apparatus implementing the speech recognizing model or a separate signal processor of the speech recognizing apparatus.

A neural network that is configured to implement the speech recognizing model 410 may include a plurality of layers 415, 420, and 425, as only examples. The layers 415 and 420 are thus representative of hidden layers and the layer 425 is representative of an output layer for outputting recognition results $Y_{t-1}$, $Y_t$, and $Y_{t+1}$, of the speech recognizing model 410. The neural network may be a recurrent neural network having one or more recurrent connections that allows information calculated in a previous time period to be used in a current time period, such as information calculated in a previous time period by one layer being used by the same layer, such as by a respectively same node of the same layer, in a current time period. Thus, the information calculated based on the recurrent connection from the previous time may be input to a layer corresponding to the current time. For example, FIG. 4 demonstrates that output values of the layer 420 at the first time are re-input, e.g., through one or more recurrent connections, to the layer 420 at the second time which is subsequent in time to the first time, and output values of the layer 420 at the second time are input, e.g., through one or more recurrent connections, to the layer 420 corresponding to the third time which is subsequent in time to the second time. Thus, with these illustrated example recurrent connections, the layer 420 calculates a value to be output at the second time based on the recurrent output value output by the layer 420 at the first time as well as based on output values output from the example hierarchical lower layer 415 at the second time. Also other connections from a layer in the previous time may be made to one or more hierarchically lower layers in the current time A weight determiner 430 included in the speech recognizing model 410 receives a feedback indicating information on the previous time from at least one hierarchical upper layer of the neural network and adaptively determines the attention weight to be applied to the speech signal based on the feedback indicating the information. For example, the weight determiner 430 receives the feedback indicating respective output values output by at least one of the layers 415, 420, or 425 of the neural network at the first time, and determines the attention weight to be applied to the speech signal $V_t$ at the second time based on the feedback indicating the information. Thus, the emphasis given between signals of different frequency areas included in the speech signal $V_t$ may be adjusted based on the attention weight, resulting on the estimated speech being based more on some frequency areas than other frequency areas according to the applied attention weight. Because the weight determiner 430 receives an output value output by a hierarchical upper hidden layer of the neural network at the previous time or an output value (or, an output value of the speech recognizing model 410) output by an output layer and dynamically adjusts a frequency component of the speech signal input for a current time based on the received information, the weight determiner 430 may model the aforementioned descending path approach of auditory selective focusing. In an example, the weight determiner 430 includes at least one layer included in the neural network of the speech recognizing model 410 or may be implemented through an additional neural network. For example, in the illustrated neural network example of FIG. 4, the weight determiner may be implemented through at least one neural network layer of the illustrated neural network that may have a separate input layer from an input layer that receives the speech signal $V_t$ input or may be implemented through layers of the neural network that are configured in parallel with connections between the input of the neural network and the example layer 415. In another example, there may be plural input layers for different trained objectives of subsequent corresponding objective layers, and the weight determiner or respective weight determiners may be implemented in parallel (or respective series) with the respective inputs or incorporated into the respective parallel sets of layers of each trained objective, so as to determine respective attention weights for each of the input received by the plural input layers.

In another example, the weight determiner 430 determines the attention weight based on at least one of a context value $C_t$ or the speech signal $V_t$ input at the current time t. The context value $C_t$ may be determined based on information on a speaker to be recognized, including, for example, an age of a speaker, a gender of the speaker, a sample speech of the speaker, or a direction of the speaker.

Thus, in an example, the weight determiner 430 may determine the attention weight using the below Equations 1 and 2, as only an example.

$$e_t = \text{attend}(V_t, h_{t-1}^1, h_{t-1}^2, h_{t-1}^3, \ldots, s_{t-1}, C_t) \quad \text{Equation 1}$$

In Equation 1, $V_t$ denotes the speech signal input to the speech recognizing model 410 at a current time t, and the speech signal may include frequency feature values of the speech frame. $h_{t-1}^1$, $h_{t-1}^2$, $h_{t-1}^3$, . . . are representative of output values (or hidden state values) of hidden layers $h^1$, $h^2$, $h^3$, . . . at a previous time t−1. For example, in the example of FIG. 4, the hidden layers $h^1$ and $h^2$ may correspond to layers 415 and 420. Here, $s_{t-1}$, denotes an output value output by the output layer at the previous time t−1. For example, in the example of FIG. 4, $s_{t-1}$ may correspond to layer 425 at the previous time t−1. As only an example, $s_{t-1}$ may be representative of a result of a softmax function when the example layer 425 is a softmax layer. In this example, the layer 425 may indicate a recognition result value, for example, a probability value or a probability vector of a phoneme, of a previous speech frame. Thus, in an example, an output value of at least one layer among the output values $h_{t-1}^1$, $h_{t-1}^2$, $h_{t-1}^3$, . . . , $s_{t-1}$ may be used to determine the attention weight. In Equation 1, $C_t$ denotes the context value including information on a target speaker to be recognized and a parameter for performing speech recognition by concentrating on a speech of the target speaker. For example, the context value $C_t$ includes information on an image of the target speaker, a speech tone of the target speaker, an identification (ID) of the target speaker, and a direction of the target speaker. For example, in response to sample information on a speech of a speaker A being input as the context value $C_t$, the speech recognizing model 410 functions as a speech signal filter suitable for the speech of the speaker A. At least one of the parameters of the example attend( ) function of Equation 1 may be used/considered to determine the attention weight.

Here, the example attend( ) function denotes a function for calculating an intermediate result value $e_t$ based on the considered parameters. In an example, attend( ) may be realized by at least one layer that calculates the intermediate result value $e_t$ in response to the parameters being input to the neural network.

$$a_t = \sigma(e_t) \quad \text{Equation 2}$$

In Equation 2, $\sigma( )$ denotes a sigmoid function for outputting a value in parentheses as any one of values from 0 to 1, and $a_t$ denotes an attention weight corresponding to a result value obtained by applying an intermediate result value $e_t$ to the sigmoid function. In one example, the intermediate result value $e_t$ is a vector having a dimension equal to a dimension of a feature vector, for example, an input vector, of the speech frame input to the speech recognizing model.

Based on Equations 1 and 2, the weight determiner 430 may calculate the attention weight $a_t$ having a value between 0 and 1 based on at least one of the example input parameters to the attend( ) function. In an example, the speech frame input to the speech recognizing model 410 includes a plurality of channels based on a frequency band, with a corresponding attention weight $a_t$ for each of the channels being calculated and applied. In an example, the weight determiner 430 may further calculate the attention weight at the current time based on one or more recurrent connections, e.g., weighted or non-weighted recurrent connections, with the weight determiner 430 at one or more previous times.

In an example, in response to the attention weight $a_t$ being applied to the speech signal, an output value $O_t$ of the hidden layer 415 of the neural network of FIG. 4 may be calculated as shown in the below Equation 3, for example.

$$O_t = \sigma(W_f a_t \otimes V_t + W_r h_{t-1} + b)$$ Equation 3

In Equation 3, $V_t$ denotes an input value input to the speech recognizing model 410 at the current time t, and $a_t$ denotes an attention weight determined by the weight determiner 430 at the current time t. $\otimes$ indicates an element-wise multiplication operation. $h_{t-1}$, denotes an output value output by an example hidden layer at the previous time t-1 (e.g., layers 415 and/or 420 from the previous time). $W_f$ denotes a forward weight applied between a hierarchical lower layer and a current layer at the current time, and $W_r$ denotes a recurrent weight applied to the output value $h_{t-1}$ in the recurrent neural network connection. b denotes a bias value for adjusting the output value $O_t$ output by the hidden layer 415 at the current time t. $\sigma()$ denotes the sigmoid function. The attention weight $a_t$, the forward weight $W_f$, the recurrent weight $W_r$, and the bias value b are learned in a training process of the neural network, such as discussed further below with respect to FIG. 11.

In an example, based on Equation 3, a hidden layer of the neural network may calculate an output value that is transferred to a hierarchical upper layer based on a speech signal to which an attention weight has been applied.

In another example, a plurality of speech frames included in a speech signal are simultaneously input to the speech recognizing model 410. In this example, the speech recognizing apparatus determines an attention weight of each of the input speech frames and applies the determined attention weight to each of the speech frames corresponding to the determined attention weight. In response to the speech frames being input to the speech recognizing model 410, speech recognition may be performed based on a context value of a speech frame at a recent time.

Referring to FIG. 5, any, any combination, or all operations of any of the example weight determiner 430 of FIG. 4 may be implemented by at least one layer 515 included in a neural network of a speech recognizing model 510. Thus, descriptions above with respect to the weight determiner of FIG. 4 are also applicable here with respect to one or more respective layers 515 included in the neural network of the speech recognizing model 510. An output value output by at least one layer of the neural network at a previous time may be input to the layer 515, as well as one or more of a context value and a feature value of a speech frame input to the speech recognizing model 510 at the current time. In an example, the layer 515 determines respective attention weights using Equations 1 and 2. The layer 515 may apply the attention weight to an input speech signal and calculate an output value of the layer 515 based on the speech signal to which the attention weight has been applied. The output value of the layer 515 may be transferred to a hierarchical upper layer 520, and a recognition result $Y_t$ of the speech recognizing model 510 is determined through a layer 525 and a layer 530, for example. Also, in an example, the layer 515 at the second time may further determine the respective attention weights based on recurrent connections with the layer 515 at the first time, just as the layer 515 at the third time may further determine the respective attention weights based on recurrent connections with the layer 515 at the second and/or first times.

Figure 6:
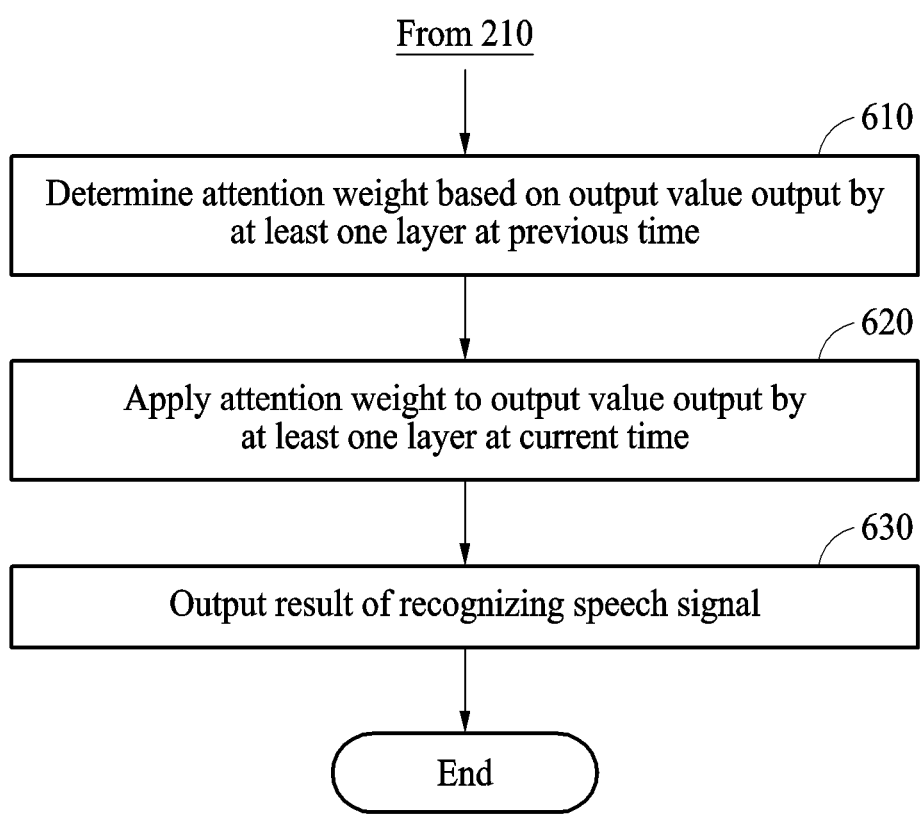
FIG. 6 is a flowchart illustrating an example of a speech recognizing process.

FIG. 6 is a flowchart illustrating an example of a speech recognizing process. Referring to FIG. 6, a speech recognizing apparatus applies attention weight(s) to value(s) transferred between layers of a neural network that is configured to implement the speech recognizing process. The descriptions provided with reference to FIG. 3 may be applicable to descriptions of FIG. 6, and thus some discussions will not be repeated for brevity purposes. Operations of FIG. 6 will be discussed with respect to the speech recognizing apparatus, which may be any of the speech recognizing apparatus 110 of FIG. 1, the speech recognizing apparatuses 1000 of FIGS. 10A and 10B, or any other speech recognizing apparatuses or training apparatuses discussed herein, noting that embodiments are not limited thereto.

Referring to FIG. 6, in operation 610, the speech recognizing apparatus determines an attention weight based on an output value output at a previous time by at least one layer of a neural network that is configured to implement a speech recognizing model. The attention weight may adjust a magnitude of an output value corresponding to a current layer to be transferred to a hierarchical upper layer of the current layer of the neural network. In an example, the speech recognizing apparatus determines the attention weight based on the output value output by at least one of a hidden layer or an output layer of the neural network at the previous time. In another example, or in addition, the speech recognizing apparatus determines the attention weight based on a feature value of a speech frame input to the speech recognizing model at a current time.

In still another example, or in further combinations, the speech recognizing apparatus determines the attention weight based on a context value determined based on information on a speaker to be recognized, e.g., in addition to the output value output by the at least one layer of the neural network at the previous time. In another example, the speech recognizing apparatus determines the attention weight based on all of the context value, the feature value of the speech frame corresponding to the current time, and the output value output by the at least one layer of the neural network at the previous time.

In operation 620, the speech recognizing apparatus applies the determined attention weight to an output value output by at least one layer at the current time. For example, the speech recognizing apparatus may apply the attention weight to at least one of connection relationships between a hierarchical lower layer and a hierarchical upper layer. In response to the attention weight being applied, a magnitude of a value transferred from the hierarchical lower layer to the hierarchical upper layer may be adjusted depending on the attention weight. For example, the value transferred may be adjusted by 0, ½, ¼, ⅛ times an original value as output by the hierarchical lower layer based on the attention weight.

Herein, references to an attention weight being determined and applied may include one or more attention weights being respectively determined and respectively applied to multiple connection relationships or an attention weight being determined applied to one connection relationship, depending on embodiment. For example, there may be a connection relationship between an input layer of an example neural network and at least a next hidden layer in the neural network. As further discussed herein, there may be recurrent connection relationships between outputs of an example layer in one or more previous times and the same layer in one or more subsequent times. There may be connection relationships between such outputs of one or more example layers in one or more previous times and other hierarchically lower layers in the neural network in the one or more subsequent times, as non-limiting examples. The recurrent or other connections between previous times and subsequent times may be sequential in time, such as demonstrated in the example of FIG. 4, though alternatives are also available, such as by relying on recurrent or other connections from one or more further previous times and not an immediately previous time for a current time recognition. There may also be convolutional connections, bias connections, and other neural network contextual or memory connections, as only examples. The number of determined attention weights may correspond to where the attention weighting is being applied, such as in the examples FIGS. 4-5 discussed above and/or FIGS. 7-8 discussed further below. Further, in determining the attention weights being applied to select connection relationships for the implemented attention mechanism, the determined attention weights may be determined to be identical or respectively different for the inputs or feature values that they are being respectively applied to. For example, when attention weights are determined, the determined attention weights having an identical value may be applied to multiple connection relationships, such as all or select connection relationships corresponding to where within the neural network the attention weighting is being implemented. Alternatively, the respective attention weights applied to each of such connection relationships corresponding to where the attention weighting is being implemented may be independently determined and thus, the applied attention weights may be different from each other between the connection relationships depending on results of the independent determinations. As a still further example, some attention weights may be identical for select connection relationships and some attention weights may be independently determined for other select connection relationships or for the remaining connection relationships corresponding to where the attention weighting is being implemented, again noting that such attention weighting may be implemented in more than one portion of the example neural network, at least such as in the example where the attention weighting of FIGS. 4-5 are also implemented along with the attention weighting of FIGS. 7 and 8, as a non-limiting example. Accordingly, while examples have been provided above and below through reference of an attention weight being determined and available to be applied to an input value, a layer output value, or a corresponding or other connection relationship before, within, or between layers, these references also include respective attention weights being determined and respectively applied to different input values, layer output values, and/or such varied connection relationships.

Thus, in operation 630, the speech recognizing apparatus indicates a result of recognizing a speech signal. In an example, a recognition result indicates information on a probability value or a probability vector of a phoneme, a probability value or a probability vector of a word, displays the result to a user, or otherwise indicates the result, such as through further controlled operations of the speech recognizing apparatus. Thus, the indicating of the result of the recognizing of the speech signal may be made either through explicit or inferential indications.

Figure 7:
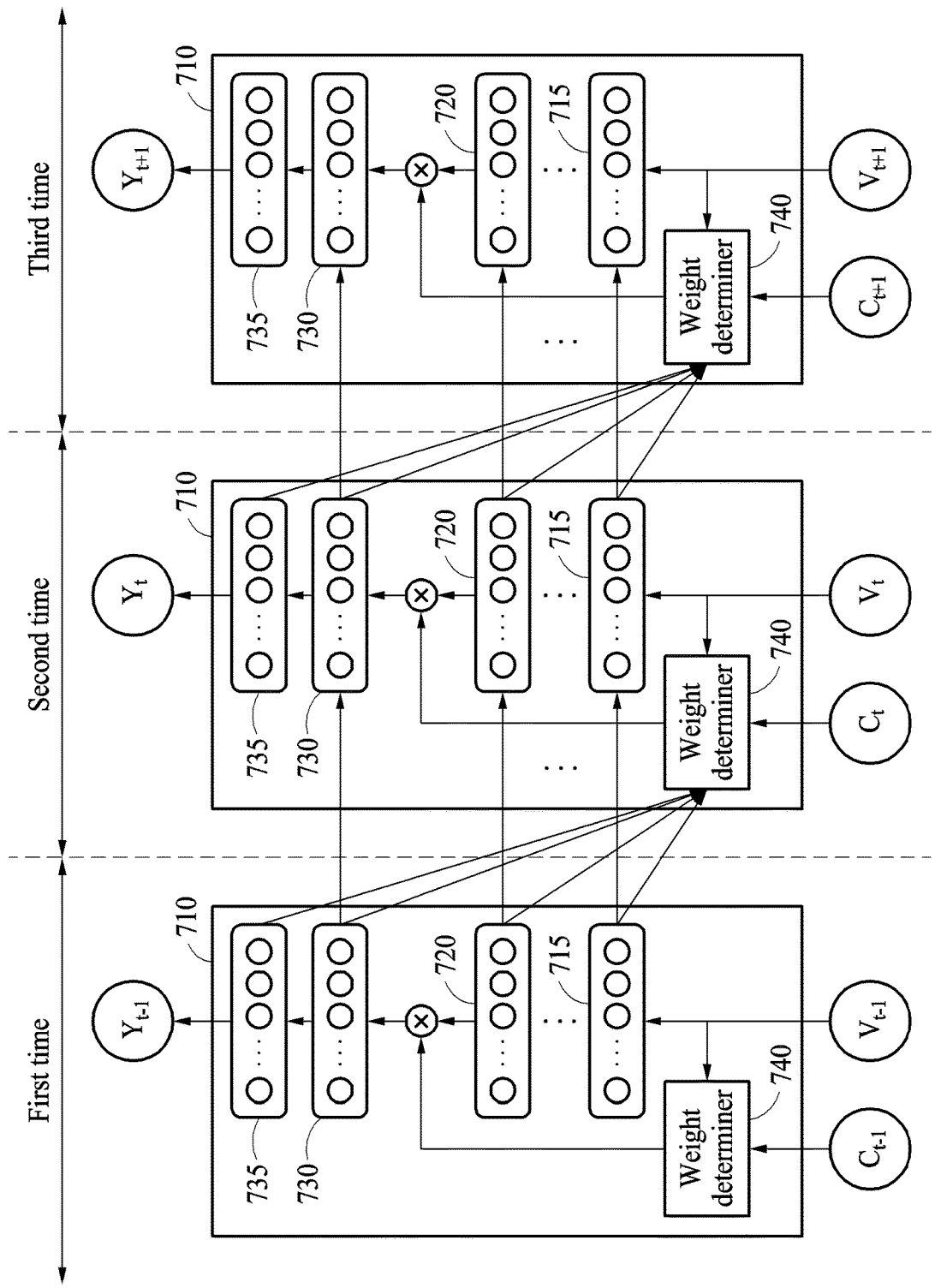
FIGS. 7 and 8 each illustrate an example in which speech recognition is performed based on a speech recognizing model.
Figure 8:
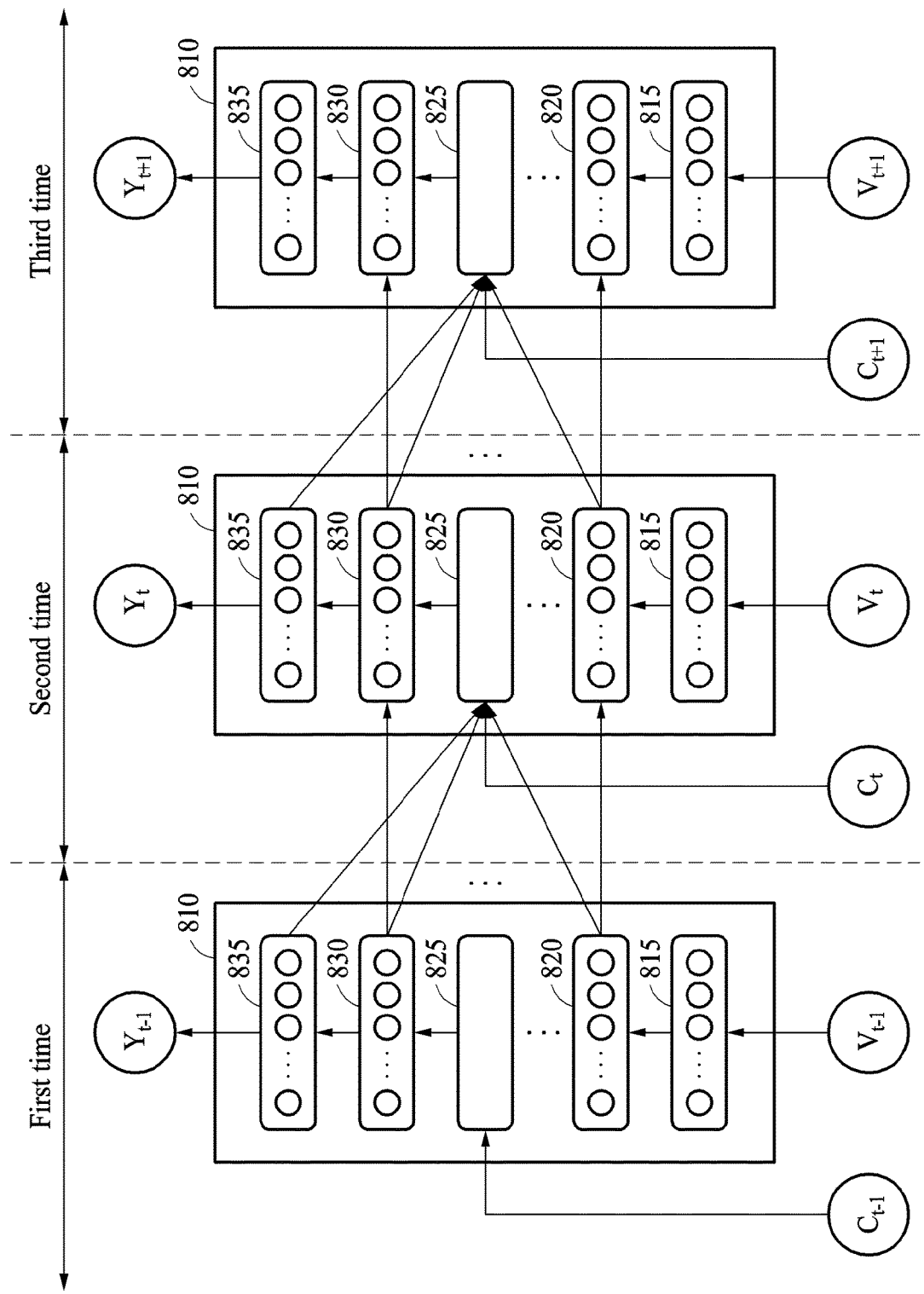

FIGS. 7 and 8 each illustrate an example in which speech recognition is performed based on a speech recognizing model. Respective operations of FIGS. 7 and 8 will be discussed respect to the speech recognizing apparatus, which may be any of the speech recognizing apparatus 110 of FIG. 1, the speech recognizing apparatuses 1000 of FIGS. 10A and 10B, or any other speech recognizing apparatuses or training apparatuses discussed herein, noting that embodiments are not limited thereto.

Referring to FIG. 7, a speech recognizing model 710 outputs a recognition result $Y_t$ based on a speech signal $V_t$ input at a current time t. A neural network that is configured to implement the speech recognizing model 710 includes layers 715, 720, 730, and 735. The neural network may be a recurrent neural network having a cyclic connection, for example.

Similar to the descriptions provided with reference to FIG. 4, and which are also applicable here, a weight determiner 740 determines an attention weight for a current time based on information on a previous time received from a hierarchical upper layer of the neural network. For example, the weight determiner 740 receives a feedback indicating an output value output by at least one of the layers 715, 720, 730, or 735 at the previous time and determines the attention weight corresponding to the current time t based on the feedback indicating information. For example, the weight determiner 740 determines the attention weight using Equations 1 and 2. In this example, $a_t$ and $e_t$ of Equations 1 and 2 may be vectors, e.g., having an identical dimension of an output value of a layer to which the attention weight is applied, as non-limiting examples.

The weight determiner 740 may include at least one layer included in the neural network of the speech recognizing model 710 or may be implemented by the speech recognizing apparatus implementing an additional neural network to determine the attention weight. Alternatively, or additionally, the weight determiner 740 may determine the attention weight based on at least one of a context value $C_t$ and/or a speech signal $V_t$ input at the current time t. The descriptions provided with reference to FIG. 4 may be applicable to a method of determining the attention weight and thus are not repeated here for brevity purposes.

The attention weight determined by the weight determiner 740 may be applied to at least one of connection relationships between a hierarchical lower layer and a hierarchical upper layer of the neural network. In an example of FIG. 7, the attention weight is applied to an output value of the layer 720 and then the result of the attention weight application is transferred to the hierarchical upper layer 730. In another example, attention weights are determined and applied to each of the connection relationships between two or more layers, with the attention weights being respectively different from each other dependent on independent determinations of their respective weights, for example. Thus, with such an example, a masking function that reduces an influence of a particular component in speech recognition based on the attention weight may be implemented.

Referring to FIG. 8, an operation of the weight determiner 740 of FIG. 7 may be implemented by at least one layer 825 included in a neural network of a speech recognizing model 810. In response to a speech signal $V_t$ being input to a layer 815 at a current time t, a value calculated through the layer 815 and a layer 820 is transferred to the layer 825. An output value output by at least one layer of the neural network at a previous time may be input to the layer 825 at the current time, as well as a context value, for example. The layer 825 may determine respective attention weights based on input information, such as discussed above. The layer 825 may transfer a result value determined by the applying of the attention weight to the value received from the hierarchical lower layer, to a hierarchical upper layer 830. A recognition result $Y_t$ of the speech recognizing model 810 may be determined through the layer 830 and a layer 835. Thus, in the example of FIG. 8, a neural network of the speech recognizing model 810 may include at least one layer that performs the operations of the layer 825.

FIG. 9 is a flowchart illustrating an example of a speech recognizing process. Operations of FIG. 9 may be sequentially performed as illustrated in FIG. 9, or an order of operations may be changed without deviating from a technical idea and the scope of the described embodiments. In addition, operations of FIG. 9 may be performed in parallel or simultaneously. Operations of FIG. 9 will be discussed respect to a speech recognizing apparatus, which may be any of the speech recognizing apparatus 110 of FIG. 1, the speech recognizing apparatuses 1000 of FIGS. 10A and 10B, or any other speech recognizing apparatuses or training apparatuses discussed herein, noting that embodiments are not limited thereto.

Referring to FIG. 9, in operation 910, the speech recognizing apparatus obtains a spectrogram of a speech frame. In an example, the speech recognizing apparatus generates the spectrogram by converting a speech signal to a signal of a frequency area through Fourier transform and extracts a feature of the speech signal from the spectrogram. As a non-limiting example, the above descriptions provided with reference to FIG. 1, for example, may be applicable to the extracting of the features of the speech signal from the spectrogram. In operation 920, the speech recognizing apparatus determines one or more attention weights to be applied to, or with respect to, a speech frame. For example, any or any combination of the above operations described with reference to FIGS. 1 through 5 may be implemented to determine the attention weight to apply selective attention to the input speech data or frames. Also, as discussed above, the above operations described with reference to FIGS. 6-8 may further be implemented to determine another attention weight to apply selective attention through adjustments of connection relationships between layers for example. In operation 930, in an example, the speech recognizing apparatus may recognize the speech frame to which the attention weight is applied in a phoneme unit using a speech recognizing model, such as where the speech recognizing model is an acoustic model. The speech recognizing apparatus may estimate words indicated by the speech signal based on a recognition result in the phoneme unit, such as by further implementing a language model.

In operation 940, the speech recognizing apparatus verifies whether a current speech frame is a last speech frame. Based on a result of the verifying that the current speech frame is the last speech frame, operation 940 terminates. Based on a result of the verifying that the current speech frame is not the last speech frame, operations 910 through 940 are performed again on a next speech frame.

The speech recognizing apparatus may then indicate results of the speech recognition.

FIGS. 10A-10B illustrate examples of a speech recognizing apparatus. The speech recognizing apparatuses of FIGS. 10A and 10B may perform any one or any combination of the operations described above with regard to FIGS. 1-9 and the below discussed FIG. 11, noting that embodiments are not limited to the same. In addition, the speech recognizing apparatuses of FIGS. 10A and 10B may correspond to any one or any combination of the speech recognizing apparatuses of FIGS. 1-9 and training apparatus of FIG. 11, noting that embodiments are not limited to the same. Also, as only an example, the speech recognizing apparatus 110 of FIG. 1 may correspond to the either or both of the speech recognizing apparatuses of FIGS. 10A and 10B.

Referring to FIGS. 10A and 10B, the respective speech recognizing apparatuses 1000 includes a memory 1020 and a processor 1010. The memory 1010 may store at least one instruction executable by the processor 1010. The memory 1020 and the processor 1010, as well as other components of the speech recognizing apparatus 1000 as demonstrated in FIG. 10B, may communicate through a bus 1025. The processor 1010 may be configured to execute at least one instruction stored in the memory 1020, e.g., as the memory 1020 being a non-transitory computer readable medium storing instructions, which when executed by one or more processors, cause the one or more processors to implement one or more or all processes described herein. For example, the processor 1010 may be configured to execute one or more or all operations described with reference to FIGS. 2 through 9 and 11 in response to one or more instructions being executed by the processor 1010. The processor may further be configured, or controlled to be configured such as based on such instructions, to implement, or correspond to, one or more neural networks as described above with respect to FIGS. 3-9, as described above. The memory 1020 may further store trained parameters of such neural network(s) and/or such instructions. Alternatively, another memory may be included in the respective speech recognizing apparatuses 1000 and may store the instructions (and/or trained neural network parameters) and/or another processor of the respective automated interpretation apparatuses 1900 may execute the stored instructions and/or store such neural network parameters.

In an example, the processor 1010 is configured to determine respective attention weights to be applied to input speech feature(s) and/or hidden layer results or connections of the implemented neural network based on output value(s) of at least one layer of the implemented neural network at a previous time.

For example, the processor may be configured to apply the determined respective attention weights to a captured speech signal corresponding to a current time and recognizes the captured speech signal to which the attention weighting has been applied using a trained speech recognizing model. The training of the speech recognizing model implemented by the neural network may also include training the neural network with varied attention weightings depending on utilized training data, as well as through training of the neural network with respect to labeled input training data through a supervised training operation, as only an example.

In another example, when the speech signal is recognized using the trained speech recognizing model, the processor 1010 may be configured to alternatively, or additionally, determine attention weighting for current time based on output values of at least one layer of the neural network at a previous time and apply the determined attention weightings to output values of a layer of the neural network at the current time, such as where the layer for which the output values are selectively adjusted based on the applied attention weighting is a layer different from an input layer of the neural network. Thus, the processor 1010 is configured to estimate a result of a recognizing of the speech signal based on the applied attention weighting.

In addition, the processor 1010, or another processor, may control sampling of sound, sampling of the captured sound, and provision of resulting sampled audio frames to the an example input layer of the neural network, such as of FIGS. 4-5 and 7-8, as only examples. The processor 1010 may further be configured to load trained parameters of the example neural networks for configuring the processor 1010 as any or any combination of the neural network examples of FIGS. 4-5 ad 7-8, as non-limiting examples. Still further, the processor 1010 may be configured to routinely request and receive updates to such stored trained parameters.

Further referring to FIG. 10B, the user interface 1030 may be representative of hardware wired and/or wireless communication modules, as well as other user interface devices, such as a keyboard, touch screen, mouse, or stylus, as only examples. In such external or remote examples, the processor 1010 may perform the sampling of a voices of users, such as of an analog signal captured by the microphone represented by the user interface 1030, and then using the hardware communication module(s) communicate the same to one or more external servers, as only an example, which may implement any of the operations described herein and/or to another processor of the speech recognizing apparatus 1000 configured to implement the speech recognizing operations described herein. As a result of the estimated speech of captured speech through the speech recognizing model implementation, the estimated speech may be output through the user interface 1030, displayed through the display 1040, or used by the processor 1010 to initiate further operations of the speech recognizing apparatus 1000, such as where the speech recognizing apparatus 1000 is a mobile device or personal assistant device and the processor 1010 controls further operations mobile device, such as initiating a phone call or playing select music, as only examples.

Figure 11:
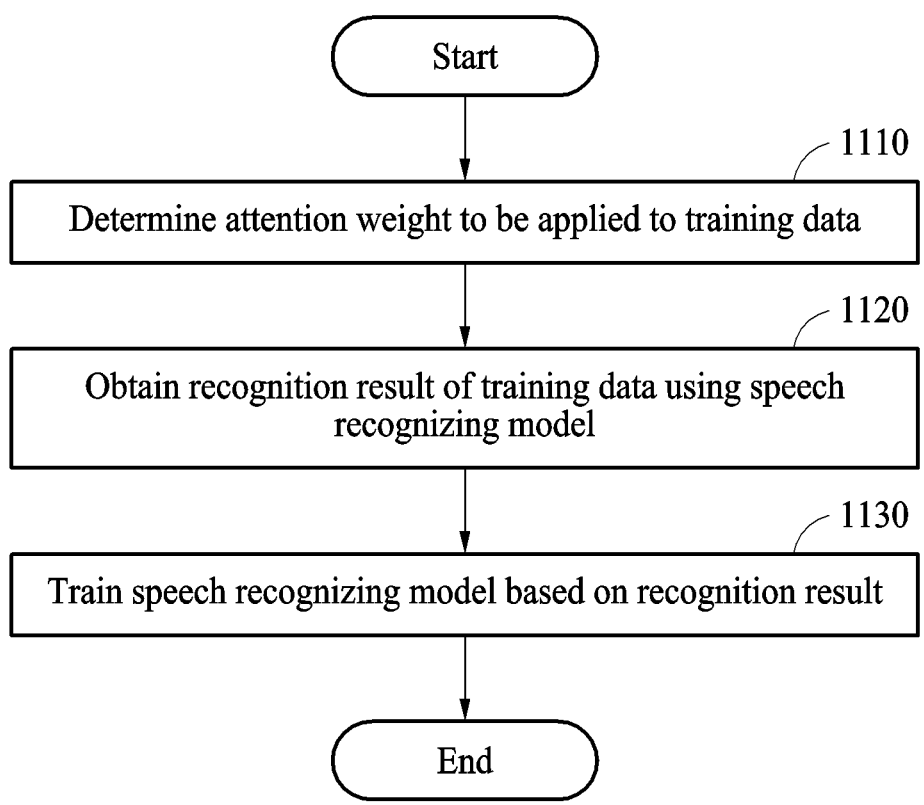
FIG. 11 is a flowchart illustrating an example of a training method of a speech recognizing model.

FIG. 11 is a flowchart illustrating an example of a training method of a speech recognizing model. The training method of FIG. 11 may be performed by a training apparatus to train the speech recognizing model of FIGS. 1 through 9 and/or may be implemented by the processor 1010 of the speech recognizing apparatus 1000 of FIGS. 10A through 10B, as described above, to train the speech recognizing models of FIGS. 1 through 9. Thus, the processor 1010 of FIGS. 10A and 10B may be representative of a speech recognizing apparatus that receives or obtains the trained parameters of a resultant trained speech recognizing model from a separate training apparatus, representative of a speech recognizing apparatus configured to perform both the training and speech recognizing discussed herein, or representative of a speech recognizing apparatus configured to implement only the training of the speech recognizing models discussed herein. Thus, through the descriptions with respect to FIG. 11 discuss training aspects of the speech recognizing models discussed herein, embodiments are not limited thereto and such disclosures are also applicable and available for combination with any of the above described speech recognizing operations and apparatuses.

Thus, referring to FIG. 11, in operation 1110, the example training apparatus determines an attention weight to be applied to training data. The training data is used in the training process of the speech recognizing model and includes plural speech signals, and may further include plural corresponding context values for training data. In an example, the training apparatus determines attention weight(s) using Equations 1 and 2.

In operation 1120, the training apparatus obtains a recognition result of the training data using the speech recognizing model as the speech recognizing model is being trained. The training apparatus may apply the attention weight to the speech signal for training and input the speech signal to which the attention weight has been applied to the speech recognizing model. In an example, the speech recognizing model outputs the recognition result in a phoneme unit based on the speech signal to which the attention weight is applied. For example, the training of the speech recognizing model may include performing acoustic training to generate a trained acoustic model.

Thus, in operation 1130, the training apparatus trains the speech recognizing model based on the recognition result obtained in operation 1120. In an example, the training apparatus repeatedly trains the speech recognizing model based on a supervised learning scheme until the speech recognizing model is trained to a predetermined accuracy level and/or predetermined minimum error level. For example, in the repeated training operations, the training apparatus repeatedly updates connection weights within and/or between nodes included in the neural network of the speech recognizing model to repeatedly generate new neural networks until one of the trained neural networks implementing the speech recognizing model outputs a desirable recognition result corresponding to the training data. For example, the training apparatus may update the connection weights between the nodes through loss backpropagation learning. The loss backpropagation learning is a method of estimating a loss by performing hierarchical forward computation on the provided training data and then updating a connection weight by reducing and propagating the loss estimated in a hierarchical reverse direction starting from an output layer to a hierarchical lower layer of the neural network. The training apparatus may define an objective function for measuring a degree to which currently set connection weights representing a trained neural network perform speech recognition close enough to an optimal value, to control the continuously changing of the connection weights based on a result of the objective function, iteratively training the speech recognizing model to generate the final trained speech recognizing model, e.g., which may be implemented in the speech recognizing apparatuses described above with respect to FIGS. 1-10B to perform the speech recognition.

Thus, in addition to such attention weight determinations and applications being implemented during use of the speech recognizing model according to FIGS. 1-10B, the training process may also include processes of learning an operation of determining attention weights. For example, in the training, in response to feature values of different frequency components of the speech signal being input to the speech recognizing model being trained, the speech recognizing model being trained may be trained to select a feature value of a frequency component which is to be more intensively considered from the feature values of other frequency components at a current time based on information of a previous time during the training. In an example, the training apparatus may define the objective function for measuring a degree to which the attention weight is close or sufficiently close to the optimal value and may continuously or repeatedly update parameters for determining the attention weight such that the result of the objective function is determined close to the optimal value.

The respective speech recognizing apparatuses, training apparatus, speech recognizing apparatus 110, speech recognizing apparatuses 1000, acoustic model 120, language model 130, speech recognizing models 410, 510, 710, and 180, weight determiners 430 and 740, processor 1010, memory 1020, bus 1025, user interface 1030, and display 1040 in FIGS. 1-11 and that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIG. 1-11 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent to after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor implemented speech recognizing method implementing a speech recognizing model neural network for recognition of a speech, the method comprising:
   determining an attention weight based on an output value directly output by at least one layer of the speech recognizing model neural network at a previous time of the recognition of the speech, the output value being input to an input layer of the speech recognizing model neural network;
   applying the determined attention weight to a speech signal corresponding to a current time of the recognition of the speech; and
   recognizing the speech signal to which the attention weight is applied, using the speech recognizing model neural network.

2. The method of claim 1, wherein the at least one layer of the speech recognizing model neural network at the previous time is a hidden layer of the speech recognizing model neural network.

3. The method of claim 2, wherein the at least one layer of the speech recognizing model neural network at the previous time includes a recurrent connection to the speech recognizing model neural network at the current time, and/or
   wherein at least one of a layer, which is next provided the speech signal to which the attention weight is applied, of the speech recognizing model neural network at the current time, and a hierarchical higher layer of the speech recognizing model neural network at the current time, includes respective connections from the speech recognizing model neural network at the previous time.

4. The method of claim 1, wherein the determining comprises determining the attention weight based on an output value output by an output layer of the speech recognizing model neural network at the previous time.

5. The method of claim 1, wherein the determining comprises determining the attention weight further based on a context value determined based on information on a speaker to be recognized for emphasizing the speaker to be recognized from among other speakers.

6. The method of claim 1, wherein the determining comprises determining the attention weight based on a context value determined based on information on a speaker to be recognized for emphasizing the speaker to be recognized from among noise.

7. The method of claim 1, wherein the determining comprises determining the attention weight further based on a feature value of a speech frame input to the speech recognizing model neural network, or processed to be input to the speech recognizing model neural network, at the current time.

8. The method of claim 1, further comprising:
   dividing the speech signal into signals of different frequency components,
   wherein the applying comprises respectively applying the determined attention weight to feature values of the signals of the different frequency components.

9. The method of claim 8, wherein the respective applying of the determined attention weight to the feature values of the signals of the different frequency components respectively and selectively, through and dependent on the respective application of the determined attention weight, emphasizes the different frequency components upon input to the speech recognizing model neural network or before input to the speech recognizing model neural network.

10. The method of claim 8, wherein the determined attention weight is a vector having a dimension equal to a speech input vector resulting from the dividing of the speech signal and to which the determined attention weight is applied in the applying.

11. The method of claim 8, wherein the feature values of the signals of the different frequency components have amplitudes represented by sizes of respective bins for the different frequency components, and the respective applying of the determined attention weight to the feature values includes selectively adjusting the sizes of the respective bins for the different frequency components based on the applied determined attention weight.

12. The method of claim 1,
   wherein the determining comprises determining respective attention weights to be applied to each of a plurality of speech frames in response to the speech frames included in the speech signal being input to the speech recognizing model neural network or processed to be input to the speech recognizing model neural network, and
   wherein the applying comprises applying the determined respective attention weights to the speech frames.

13. The method of claim 1, wherein the recognizing comprises estimating language information indicated by the speech signal to which the attention weight is applied.

14. The method of claim 13, wherein the estimating of the language information includes estimating a phoneme from the speech signal to which the attention weight is applied and the recognizing further comprises estimating a word from plural performances of the recognizing, based on respectively determined and applied attention weights, at plural times to estimate plural phonemes for the estimated word.

15. The method of claim 14, wherein the speech recognizing model neural network is configured to implement an acoustic model to perform the estimating of the phoneme and at least a language model to perform the estimating of the word.

16. The method of claim 1, wherein the determining of the attention weight is performed by a separate neural network from the speech recognizing model neural network.

17. The method of claim 1, wherein the speech recognizing model neural network is configured as being trained based on a training process that includes determining and applying training attention weights based on in-training output values output by at least one layer of an in-training speech recognizing model neural network at a previous time of a corresponding speech recognition operation of a training speech during the training of the in-training speech recognizing model.

18. The method of claim 1, further comprising:
   determining another attention weight based on the output value output by the at least one layer of the speech recognizing model neural network at the previous time and/or another at least one layer of the speech recognizing model neural network at the previous time; and
   applying the determined other attention weight to an output value output of a hidden layer of the speech recognizing model neural network at the current time or to a connection of the hidden layer.

19. A processor implemented speech recognizing method implementing a speech recognizing model neural network for recognition of a speech, the method comprising:
   determining an attention weight based on an output value directly output by at least one layer of the speech recognizing model neural network at a previous time of the recognition of the speech;

applying the determined attention weight to a speech signal corresponding to a current time of the recognition of the speech;

determining another attention weight based on the output value output by the at least one layer of the speech recognizing model neural network at the previous time and/or another at least one layer of the speech recognizing model neural network at the previous time;

applying the determined other attention weight to an output value output of a hidden layer of the speech recognizing model neural network at the current time; and recognizing the speech signal to which the attention weight is applied, using the speech recognizing model neural network in which the output value output of the hidden layer is applied the other attention weight.

20. A non-transitory computer-readable medium storing instructions that, when executed by a processor, cause the processor to perform the method of claim 1.

21. A processor implemented speech recognizing method implementing a speech recognizing model neural network for a recognition of a speech, the method comprising:

receiving a speech signal; and recognizing the speech signal using the speech recognizing model neural network, wherein the recognizing comprises:

determining an attention weight based on an output value directly output by at least one layer of the speech recognizing model neural network at a previous time of the recognition of the speech, and applying the determined attention weight to a value of a layer of the speech recognizing model neural network at a current time of the recognition of the speech, wherein the recognizing of the speech signal further comprises:

estimating language information indicated by the speech signal, including estimating a phoneme from the speech signal using the layer of the speech recognizing model neural network to which the attention weight is applied; and estimating a word from plural performances of the recognizing, based on respectively determined and applied attention weights, at plural times to estimate plural phonemes for the estimated word.

22. The method of claim 21, wherein the application of the determined attention weight to the value of the layer of the speech recognizing model neural network includes applying the determined attention weight to an output value output by the layer of the speech recognizing model neural network at the current time to adjust a magnitude of the output value output by the layer of the speech recognizing model neural network at the current time, as a resultant value output to a hierarchical upper layer from the layer of the speech recognizing model neural network at the current time.

23. The method of claim 21, wherein the application of the determined attention weight to the value of the layer of the speech recognizing model neural network at the current time includes adjusting, based on the determined attention weight, a trained connection weight structurally implemented within, or as a connection weighting to or from, the layer of the speech recognizing neural network at the current time.

24. The method of claim 21, wherein the determining comprises determining the attention weight based on an output value output by either one or both of a hidden layer and an output layer of the neural network at the previous time.

25. The method of claim 21, wherein the determining comprises determining the attention weight further based on a context value determined based on information on a speaker to be recognized for emphasizing the speaker to be recognized from among other speakers.

26. The method of claim 21, wherein the determining comprises determining the attention weight further based on a feature value of a speech frame input to the speech recognizing model at the current time.

27. The method of claim 21, wherein the recognizing further comprises:

determining another attention weight based on the output value output by the at least one layer of the speech recognizing model neural network at the previous time and/or another at least one layer of the speech recognizing model neural network at the previous time, and applying the determined other attention weight to the speech signal at the current time and performing the recognition of the speech based on the speech signal which the determined other attention weight is applied.

28. A speech recognizing apparatus, the apparatus comprising:

a processor configured to determine an attention weight based on an output value directly output by at least one layer of a speech recognizing model neural network at a previous time of a recognition of a speech, the output value being input to an input layer of the speech recognizing model neural network, apply the determined attention weight to a speech signal corresponding to a current time of the recognition of the speech, and implement a recognizing, using the speech recognizing model neural network, of the speech signal to which the attention weight is applied.

29. The apparatus of claim 28, further comprising a non-transitory computer readable memory configured to store instructions, which when executed by the processor cause the processor to perform the determining of the attention weight based on the output value, the applying of the determined attention weight to the speech signal, and the implementing of the recognizing of the speech signal to which the attention weight is applied.

30. The apparatus of claim 28, wherein the processor is further configured to include the speech recognizing model neural network.

31. The apparatus of claim 28, wherein the speech recognizing model neural network comprises at least one layer configured to perform the determining of the attention weight.

32. The apparatus of claim 31, wherein any one or any combination of any two or more of a context value, a feature value of a speech frame input to, or processed for input to, the speech recognizing model neural network at the current time, and the output value output by the at least one layer of the speech recognizing model neural network at the previous time is input to the at least one layer configured to perform the determining of the attention weight for the determining of the attention weight.

33. A speech recognizing system, the system comprising:

a first processor configured to determine an attention weight based on an output value directly output by at least one layer of a speech recognizing model neural network at a previous time of a recognition of a speech, the output value being input to an input layer of the speech recognizing model neural network; and a second processor configured to include the speech recognizing model neural network, and recognize a speech signal, to which the determined attention weight has been applied for a current time of the recognition of the speech, using the speech recognizing model neural network for the recognition of the speech, wherein the first processor is further configured to divide the speech signal into signals of different frequency components, and wherein the recognizing of the speech signal, to which the determined attention weight has been applied, includes recognizing the divided speech signal to which the determined attention weight has been respectively applied to feature values of the signals of the different frequency components.

34. The system of claim 33, wherein the respective application of the determined attention weight to the feature values of the signals of the different frequency components respectively and selectively, through and dependent on the respective application of the determined attention weight, emphasize the different frequency components upon input to the speech recognizing model neural network or before input to the speech recognizing model neural network.

35. A speech recognizing apparatus, the apparatus comprising:
a processor configured to:
determine an attention weight based on an output value directly output by at least one layer of a speech recognizing model neural network at a previous time of a recognition of a speech;
apply the determined attention weight to an output value output by a layer of the speech recognizing model neural network at a current time of the recognition of the speech; and
implement an estimating of a result of a recognizing of a speech signal at the current time using the speech recognizing model neural network implemented with the applied determined attention weight,
wherein, for the recognizing of the speech signal, the processor is further comprises:
estimate language information indicated by the speech signal, including estimating a phoneme from the speech signal using the layer of the speech recognizing model neural network to which the attention weight is applied; and
estimate a word from plural performances of the recognizing, based on respectively determined and applied attention weights, at plural times to estimate plural phonemes for the estimated word.

36. The apparatus of claim 35, further comprising a non-transitory computer readable memory configured to store instructions, which when executed by the processor cause the processor to perform the determining of the attention weight, the applying of the determined attention weight, the implementing of the estimating of the result of the recognizing of the speech signal using the speech recognizing model neural network implemented with the applied determined attention weight, the estimating of the language information, the estimating of the phoneme, and the estimating of the word from the plural performances of the recognizing.

37. The apparatus of claim 35, wherein the speech recognizing model neural network comprises at least one layer configured to perform the determining of the attention weight.

38. A speech recognizing apparatus, the apparatus comprising:
a processor configured to
determine an attention weight based on information directly from a connection from a speech recognizing model neural network at a previous time of a recognition of a speech and based on a context value and/or a feature value of a corresponding speech frame, the information directly from the connection, and the context value and/or the feature value being input to, or processed for input to, the speech recognizing model neural network at a current time of the recognition of the speech,
apply the determined attention weight to a speech signal corresponding to the current time of the recognition of the speech, and
implement a recognizing, using the speech recognizing model neural network, of the speech signal to which the attention weight is applied.

39. The apparatus of claim 38, wherein the speech recognizing model neural network comprises at least one layer configured to perform the determining of the attention weight based on the information from the connection from the speech recognizing model neural network at the previous time, and based on the context value and/or the feature value.

40. The apparatus of claim 38, wherein the context value is determined based on information on a speaker to be recognized for emphasizing the speaker to be recognized from among other speakers.

41. A processor implemented speech recognizing method implementing a speech recognizing model neural network for recognition of a speech, the method comprising:
applying a determined attention weight corresponding to a current time to a speech signal corresponding to a current time of the recognition of the speech;
determining the attention weight based on respective output values directly output by plural layers of the speech recognizing model neural network at a previous time of the recognition of the speech, the output value being input to an input layer of the speech recognizing model neural network; and
recognizing the speech signal to which the attention weight is applied, using the speech recognizing model neural network.

* * * * *